(12) United States Patent
Kawamura et al.

(10) Patent No.: US 11,607,362 B2
(45) Date of Patent: Mar. 21, 2023

(54) WALKING SUPPORT SYSTEM

(71) Applicant: TOYOTA JIDOSHA KABUSHIKI KAISHA, Toyota Aichi-ken (JP)

(72) Inventors: Hiroaki Kawamura, Nagoya Aichi-ken (JP); Kohei Shintani, Nisshin Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/503,773

(22) Filed: Oct. 18, 2021

(65) Prior Publication Data

US 2022/0218556 A1 Jul. 14, 2022

(30) Foreign Application Priority Data

Jan. 12, 2021 (JP) .............................. JP2021-002697

(51) Int. Cl.
*A61H 3/06* (2006.01)
*H04N 5/247* (2006.01)
*G09B 21/00* (2006.01)
*G08G 1/005* (2006.01)
*G06V 10/147* (2022.01)
*G06V 20/20* (2022.01)

(52) U.S. Cl.
CPC .............. *A61H 3/061* (2013.01); *A61H 3/068* (2013.01); *G06V 10/147* (2022.01); *G06V 20/20* (2022.01); *G08G 1/005* (2013.01); *G09B 21/003* (2013.01); *G09B 21/006* (2013.01); *H04N 5/247* (2013.01); *A61H 2003/063* (2013.01); *A61H 2201/5092* (2013.01)

(58) Field of Classification Search
CPC .... A61H 3/061; A61H 3/068; H04N 5/23218; H04N 5/247; G08G 1/005; G09B 21/003
See application file for complete search history.

(56) References Cited

U.S. PATENT DOCUMENTS

2019/0307632 A1 10/2019 Yashiro et al.
2021/0369545 A1* 12/2021 Ghosh .................. G06K 9/6267

FOREIGN PATENT DOCUMENTS

WO 2018025531 A1 2/2018

OTHER PUBLICATIONS

Hiroaki Kawamura et al., U.S. Appl. No. 17/530,476, filed Nov. 19, 2021.

(Continued)

*Primary Examiner* — Kathleen V Nguyen
(74) *Attorney, Agent, or Firm* — Dinsmore & Shohl LLP

(57) ABSTRACT

When it is determined that a presence of a traffic light is not recognized in an image acquired by a first image acquisition operation by a camera, the presence of the traffic light is recognized in an image acquired by a second image acquisition operation in which a recognition accuracy of the presence of the traffic light is improved. In this second image acquisition operation, it is assumed that a pedestrian is stopped in front of a pedestrian crossing, and there is little demand for increasing a detection speed of objects such as moving objects present in a surrounding area. Thus, it is possible to sufficiently obtain the recognition accuracy of the traffic light by the second image acquisition operation that gives priority to the recognition accuracy of the presence of the traffic light.

9 Claims, 12 Drawing Sheets

(56) References Cited

OTHER PUBLICATIONS

U.S. Appl. No. 17/238,723, filed Apr. 23, 2021; Inventors: Mashio Taniguchi et al.
U.S. Appl. No. 17/478,962, filed Sep. 20, 2021; Inventors: Kohei Shintani et al.

* cited by examiner

WALKING SUPPORT SYSTEM

CROSS-REFERENCE TO RELATED APPLICATION

This application claims priority to Japanese Patent Application No. 2021-002697 filed on Jan. 12, 2021, incorporated herein by reference in its entirety.

BACKGROUND

1. Technical Field

The present disclosure relates to a walking support system. In particular, the present disclosure relates to a measure for improving a recognition accuracy of a traffic light installed at a pedestrian crossing so as to determine whether to issue a notification to start crossing a pedestrian crossing to a pedestrian such as a visually impaired person.

2. Description of Related Art

As a system (walking support system) that issues a notification to start crossing a pedestrian crossing to a pedestrian such as a visually impaired person so that the pedestrian can safely cross the pedestrian crossing, a system disclosed in the republished patent WO 2018/025531 is known. This republished patent WO 2018/025531, discloses a system including a direction determination unit that determines a direction in which a person who acts without vision (visually impaired person) walks, and a guide information generation unit that generates guide information for the visually impaired person to walk in a determined direction, in which the walking direction of the visually impaired person is determined by matching the image from a camera carried by the visually impaired person with a reference image stored in advance, and guidance of the walking direction is performed to the visually impaired person by voice or the like.

SUMMARY

By the way, in a situation where the pedestrian (such as the visually impaired person) actually approaches the pedestrian crossing, the position where the pedestrian should stop is in front of the pedestrian crossing. The timing at which the pedestrian crosses the pedestrian crossing is the timing at which the traffic light (for example, a pedestrian traffic light) is a green light. In order to appropriately issue the notification to start crossing to the pedestrian (a notification to stop walking in front of the pedestrian crossing and the notification to start crossing thereafter), the position of the pedestrian crossing needs to be accurately recognized (the position of a white line on a foremost side of the pedestrian crossing) and the state of the traffic light (whether it is a green light or a red light) based on information from image acquisition unit such as a camera.

In a situation in which the pedestrian reaches the front of the pedestrian crossing, the white line on the foremost side of the pedestrian crossing is positioned near the feet (a position slightly in front of the feet) of the pedestrian. The position of this white line is a position relatively close to the pedestrian and a position on the lower side (diagonally lower side) when viewed from the pedestrian, and is a position relatively close to a camera carried by the pedestrian (a camera that captures the front of the pedestrian in the walking direction) and a position on a lower side to the camera. In contrast, in a situation in which the pedestrian reaches the front of the pedestrian crossing and stops, the traffic light to be recognized is the traffic light installed at the crossing destination (the traffic light installed at the position across the pedestrian crossing). The position of this traffic light is relatively far from the pedestrian, and is also relatively far from the camera carried by the pedestrian. Thus, a wide-angle camera is required to capture both the white line of the pedestrian crossing (the white line on the foremost side) and the traffic light with the camera carried by the pedestrian.

When the pedestrian is walking, there is a need to recognize moving objects (bicycles, automobiles, and the like) around the pedestrian, and capture various recognition targets in which the relative positions change as the pedestrian is walking and perform object detection at high speed. In order to realize this, there is a limit to the resolution of the camera.

In this way, when a relatively wide field of view (a relatively wide field of view for capturing both the pedestrian crossing and the traffic light) is realized by the camera having a limited resolution (the resolution is limited in order to increase the object detection speed), since an occupied area of the traffic light with respect to the entire image is small and the resolution is also low in the image taken by the camera, there is a case in which it is not possible to recognize the presence of the traffic light (the position of the traffic light) and the state of the traffic light (whether it is a green light or a red light) with high accuracy from the information in this image.

The present disclosure has been made in view of the above points, and an object of the present disclosure is to provide a walking support system capable of sufficiently acquiring a recognition accuracy of a traffic light and appropriately issuing a notification to start crossing to a pedestrian.

A solution for achieving to above object is based on the premise of a walking support system that at least issues a notification to start crossing to a pedestrian (crossing start notification) when the pedestrian crosses a pedestrian crossing. This walking support system includes an image acquisition unit, a first image acquisition operation instruction unit, a traffic light recognition determination unit, and a second image acquisition operation instruction unit. The image acquisition unit can acquire an image of the pedestrian in front of the pedestrian in a walking direction. The first image acquisition operation instruction unit makes the image acquisition unit perform a first image acquisition operation, in a state where both the pedestrian crossing and a traffic light are present in a field of view of the image acquisition unit when the pedestrian crossing is present in front of the pedestrian in the walking direction. The traffic light recognition determination unit determines whether a presence of the traffic light is recognized in an image acquired by the first image acquisition operation. The second image acquisition operation instruction unit makes the image acquisition unit perform a second image acquisition operation when the traffic light recognition determination unit determines that the presence of the traffic light is not recognized. A recognition accuracy of the presence of the traffic light is made to be higher in the second image acquisition operation than in the first image acquisition operation.

Due to this specific matter, the first image acquisition operation is performed by the image acquisition unit, in a state where both the pedestrian crossing and the traffic light are present in the field of view of the image acquisition unit when the pedestrian crossing is present in front of the pedestrian in the walking direction. The traffic light recognition determination unit determines whether the presence of the traffic light is recognized in the image acquired by the first image acquisition operation. When the existence of a traffic light is recognized, the state of the traffic light is recognized using this acquired image. For example, when the traffic light switches from the stopping instruction state (red light) to the crossing permission state (green light), the notification to start crossing is issued to the pedestrian. In contrast, when the presence of the traffic light is not recognized in the image acquired by the first image acquisition operation, the second image acquisition operation in which the recognition accuracy of the presence of the traffic light is made to be higher than the first image acquisition operation may be performed. This makes it easier to recognize the presence of the traffic light. In this second image acquisition operation, although there is a possibility that the recognition accuracy of the presence of the traffic light is improved and that the object detection speed is decreased, as the timing at which this second image acquisition operation is performed, it is assumed that a pedestrian is stopped in front of a pedestrian crossing, and there is little demand for increasing a detection speed of objects such as moving objects present in a surrounding area. Thus, the second image acquisition operation is an image acquisition operation in which the recognition accuracy of the presence of the traffic light is improved. When the presence of the traffic light is recognized in the image acquired by this second image acquisition operation, the state of the traffic light is recognized using this acquired image. For example, when the traffic light switches from the stopping instruction state to the crossing permission state, the notification to start crossing is issued to the pedestrian. Thus, the sufficient recognition accuracy of the traffic light can be acquired and it is possible to appropriately issue the notification to start crossing to the pedestrian.

In addition provided is: a traffic light state determination unit that determines whether the state of the traffic light recognized by the image acquired by the first image acquisition operation or an image acquired by the second image acquisition operation is a stopping instruction state or a crossing permission state; a switching recognition unit that recognizes that the state of the traffic light determined by the traffic light state determination unit is switched from the stopping instruction state to the crossing permission state; and a notification unit for issuing the notification to start crossing to the pedestrian on a condition that the state of the traffic light recognized by the switching recognition unit switches from the stopping instruction state to the crossing permission state.

According to this, the traffic light state determination unit determines whether the state of the traffic light recognized by the image acquired by the first image acquisition operation or the image acquired by the second image acquisition operation is the stopping instruction state or the crossing permission state. When the switching recognition unit recognizes that the state of the traffic light has been switched from the stopping instruction state to the crossing permission state, the switching recognition unit transmits the recognition signal to the notification unit. The notification unit receives this signal and issues the notification to start crossing to the pedestrian. That is, the notification to start crossing is issued to the pedestrian on the condition that the traffic light switches from the stopping instruction state to the crossing permission state. Thus, when the pedestrian crosses the pedestrian crossing, it is possible to secure a sufficient time during which the state of the traffic light is the crossing permission state.

Further, a white line recognition unit that recognizes a white line of the pedestrian crossing from the image acquired by the first image acquisition operation is provided. A range in which the traffic light is present is specified based on a position of the white line that is recognized in the image.

When the pedestrian crosses a general intersection where a traffic light is installed, in a state in which the pedestrian stops in front of the pedestrian crossing, the traffic light is positioned above the pedestrian crossing in the field of view of the pedestrian (more specifically, the field of view of the image acquisition unit). Thus, by specifying the range in which the traffic light is present based on the position of the white line of the pedestrian crossing in the image acquired by the image acquisition operation, it is possible to further improve the recognition accuracy of the traffic light.

Further, specific unit for increasing the recognition accuracy of the presence of the traffic light in the above-mentioned second image acquisition operation to be higher than the recognition accuracy of the presence of the traffic light in the first image acquisition operation include the following.

First, the recognition accuracy of the presence of the traffic light is made to be higher in the second image acquisition operation than in the first image acquisition operation by capturing at a higher resolution than the first image acquisition operation.

Further, the image acquisition unit includes a first image acquisition unit that performs the first image acquisition operation and a second image acquisition unit that performs the second image acquisition operation, and a viewing angle of the second image acquisition unit is set to be smaller than a viewing angle of the first image acquisition unit. In this case, for example, the first image acquisition unit and the second image acquisition unit are cameras having different viewing angles. Further, the viewing angle may be changed by changing the lens in the same camera. That is, the first image acquisition unit is configured by using a lens having a large viewing angle, and the second image acquisition unit is configured by using a lens having a small viewing angle.

By improving the recognition accuracy of the presence of the traffic light in the second image acquisition operation by these unit, it is possible to appropriately issue a notification to start crossing to the pedestrian.

Further, provided is a storage unit that stores: a first state transition function for determining whether a condition for issuing a notification to stop walking to the pedestrian in a walking state in front of the pedestrian crossing is satisfied; a traffic light detection function for determining whether the presence of the traffic light is recognized in the image acquired by the first image acquisition operation when the pedestrian is in a stopped state in front of the pedestrian crossing; a second state transition function for determining whether a condition for issuing the notification to start crossing the pedestrian crossing to the pedestrian in the stopped state in front of the pedestrian crossing is satisfied; a third state transition function for determining whether a condition for issuing a warning of deviation from the pedestrian crossing to the pedestrian in a crossing state of the pedestrian crossing is satisfied; and a fourth state transition function for determining whether a condition for issuing a notification that the crossing of the pedestrian crossing has been completed to the pedestrian in the crossing state of the pedestrian crossing is satisfied, in which the notification unit is configured to issue a notification to the pedestrian in accordance with the satisfaction of the condition when the condition is satisfied by each state transition function.

That is, when it is determined by the first state transition function that the condition for issuing a notification to stop walking is satisfied, the notification unit notifies the pedestrian in the walking state to stop walking. When the pedestrian is in the stopped state in front of the pedestrian crossing, it is determined by the traffic light detection function whether the presence of the traffic light is recognized in an image acquired by the first image acquisition operation, and when it is determined that the presence of the traffic light is recognized, the state of the traffic light is recognized from the image acquired by this first image acquisition operation. In contrast, when it is determined by the traffic light detection function that the presence of the traffic light is not recognized in the image acquired by the first image acquisition operation, the second image acquisition operation in which the recognition accuracy of the presence of the traffic light is improved is performed and the presence of the traffic light is recognized in the image acquired by the second image acquisition operation. After that, when it is determined by the second state transition function that the condition for issuing a notification to start crossing the pedestrian crossing is satisfied, the notification unit issues a notification to start crossing the pedestrian crossing to the pedestrian in the stopped state in front of the pedestrian crossing. Further, when it is determined by the third state transition function that the condition for issuing a warning of deviation from the pedestrian crossing is satisfied, the notification unit issues a warning of deviation from the pedestrian crossing to the pedestrian in the crossing state of the pedestrian crossing. When it is determined by the fourth state transition function that the condition for issuing a notification that the pedestrian has completed crossing the pedestrian crossing is satisfied, the notification unit issues a notification that the pedestrian has completed crossing the pedestrian crossing to the pedestrian. By these operations, it is possible to appropriately issue each notification to the pedestrian when crossing the pedestrian crossing.

Further, an algorithm for determining whether the presence of the traffic light is recognized in the image acquired by the first image acquisition operation and an algorithm for determining whether the presence of the traffic light is recognized in an image acquired by the second image acquisition operation may be algorithms different from each other.

This makes it possible to determine whether the presence of the traffic light is recognized by the algorithm suitable for each image acquisition operation.

Moreover, the notification unit is built in a white cane used by a visually impaired person, and is configured to notify the visually impaired person that is using the white cane by vibration or voice.

As a result, it is possible to appropriately notify the visually impaired person who is walking while holding the white cane when the visually impaired person is crossing the pedestrian crossing.

When each of the image acquisition unit, the first image acquisition operation instruction unit, the traffic light recognition determination unit, the second image acquisition operation instruction unit, the traffic light state determination unit, the switching recognition unit, and the notification unit are built in the white cane, the walking support system can be realized only with the white cane, and a highly practical walking support system can be provided.

In the present disclosure, when it is determined that a presence of a traffic light is not recognized in an image acquired by a first image acquisition operation by an image acquisition unit, the presence of the traffic light is recognized in the image acquired by the second image acquisition operation in which the recognition accuracy of the presence of the traffic light is improved. In this second image acquisition operation, although there is a possibility that the recognition accuracy of the presence of the traffic light is improved and that the object detection speed is decreased, as the timing at which this second image acquisition operation is performed, it is assumed that a pedestrian is stopped in front of a pedestrian crossing, and there is little demand for increasing a detection speed of objects such as moving objects present in a surrounding area. Thus, since the presence of the traffic light is recognized in the image acquired by the second image acquisition operation in which the recognition accuracy of the presence of the traffic light is improved, the sufficient recognition accuracy of the traffic light can be acquired and it is possible to appropriately issue the notification to start crossing to the pedestrian.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. In the present embodiment, a case where a walking support system according to the present disclosure is built in a white cane used by a visually impaired person will be described. A pedestrian in the present disclosure is not limited to a visually impaired person.

Outline Structure of White Cane

Figure 1:
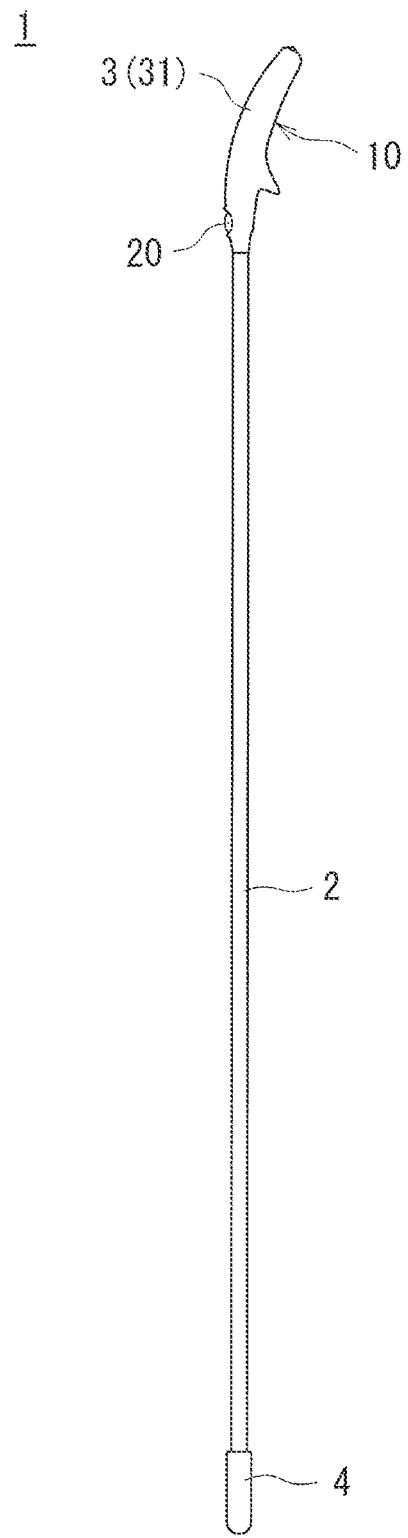
FIG. 1 is a diagram showing a white cane incorporating a walking support system according to an embodiment.

FIG. 1 is a diagram showing a white cane 1 incorporating a walking support system 10 according to the present embodiment. As shown in FIG. 1, the white cane 1 includes a shaft portion 2, a grip portion 3, and a tip portion (stone tip) 4.

The shaft portion 2 has a hollow rod-like shape having a substantially circular cross section, and is made of an aluminum alloy, a glass fiber reinforced resin, a carbon fiber reinforced resin, or the like.

The grip portion 3 is configured by attaching a cover 31 made of an elastic body such as rubber to a base end portion (upper end portion) of the shaft portion 2. Further, the grip portion 3 of the white cane 1 in the present embodiment is slightly curved toward the tip side (upper side in FIG. 1) in consideration of ease of holding and resistance to slipping when a visually impaired person (pedestrian) grips the grip portion 3.

The tip portion 4 is a substantially bottomed tubular member made of a hard synthetic resin or the like, and is extrapolated to the tip portion of the shaft portion 2 and fixed by adhesion or screwing. For safety, the tip portion 4 has a hemispherical end face on the tip side.

The white cane 1 according to the present embodiment is a straight cane that cannot be folded. However, the white cane 1 may be foldable or expandable/contractible at one or a plurality of locations in the middle of the shaft portion 2.

Configuration of Walking Support System

The feature of this embodiment is in the walking support system 10 built in the white cane 1. Hereinafter, the walking support system 10 will be described.

Figure 2:
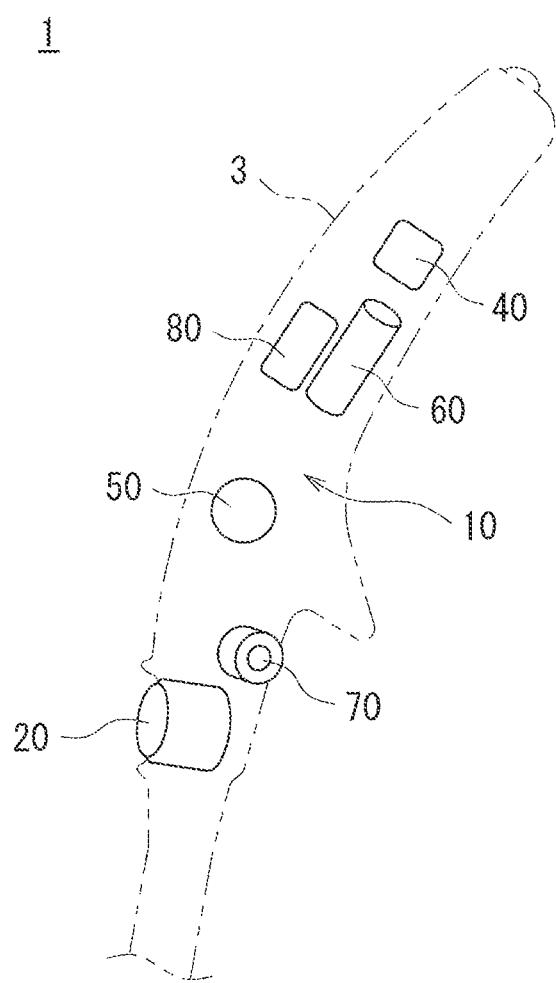
FIG. 2 is a schematic view showing the inside of a grip portion of the white cane.

FIG. 2 is a schematic view showing the inside of the grip portion 3 of the white cane 1. As shown in FIG. 2, the walking support system 10 according to the present embodiment is built in the white cane 1. Further, FIG. 3 is a block diagram showing a schematic configuration of a control system of the walking support system 10.

Figure 3:
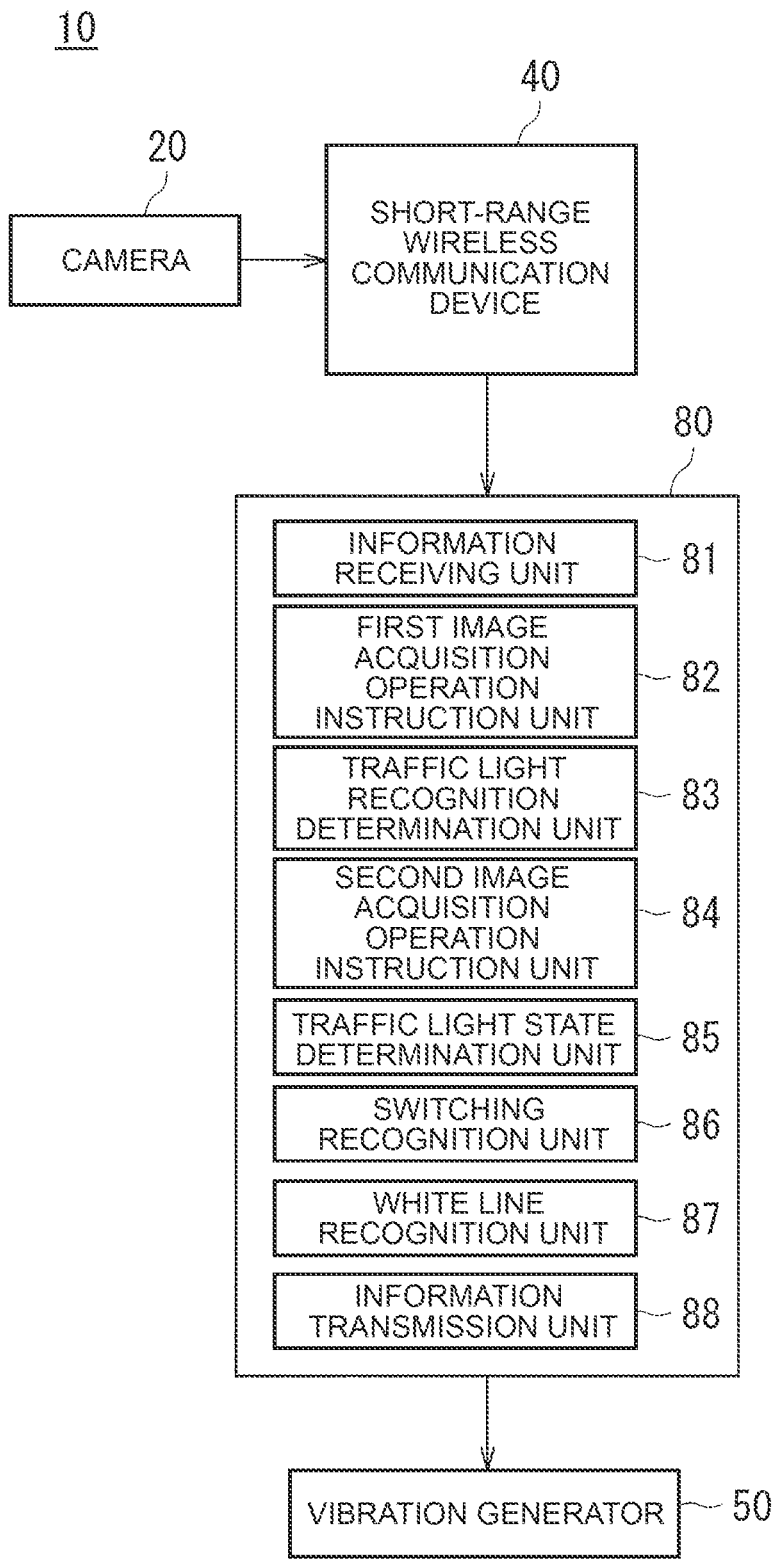
FIG. 3 is a block diagram showing a schematic configuration of a control system of the walking support system.

As shown in FIG. 2 and FIG. 3, the walking support system 10 includes a camera (image acquisition unit) 20, a short-range wireless communication device 40, a vibration generator (notification unit) 50, a battery 60, a charging socket 70, a control device 80, and the like.

The camera 20 is embedded in a front surface of the grip portion 3 (a surface facing the traveling direction of the visually impaired person) at a base portion of the grip portion 3, and photographs the front side in the traveling direction of the visually impaired person. The camera 20 is made of, for example, a charge coupled device (CCD), a complementary metal oxide semiconductor (CMOS), or the like. Further, the configuration and the arrangement position of the camera 20 are not limited to those described above, and the camera 20 may be, for example, embedded in a front surface of the shaft portion 2 (a surface facing the traveling direction of the visually impaired person).

The feature of the camera 20 is that the camera 20 is configured as a wide-angle camera capable of acquiring an image that is an image ahead of the walking visually impaired person in the traveling direction and that includes both of a white line closest to the visually impaired person among the white lines of a pedestrian crossing and a traffic light positioned in front of the visually impaired person (for example, a traffic light for pedestrians), when the visually impaired person reaches the pedestrian crossing. In other words, the configuration is such that when the visually impaired person reaches the front of the pedestrian crossing, the white line on the foremost side of the pedestrian crossing near the visually impaired person's feet (a position slightly in front of the feet) and the traffic light installed at a point of the crossing destination can both be shot. As described above, the viewing angle required for the camera 20 is appropriately set so that the image including both the white line (white line of the pedestrian crossing) at the position closest to the visually impaired person and the traffic light can be acquired. The details of this viewing angle will be described later.

The short-range wireless communication device 40 is a wireless communication device for performing short-range wireless communication between the camera 20 and the control device 80. For example, the configuration is such that, by well-known communication technique such as Bluetooth (registered trademark), a short-range wireless communication is performed between the camera 20 and the control device 80, and the information of the image captured by the camera 20 is wirelessly transmitted to the control device 80.

The vibration generator 50 is arranged above the camera 20 at the base portion of the grip portion 3. The vibration generator 50 vibrates with the operation of a built-in motor, and by transmitting the vibration to the grip portion 3, various notifications can be sent to the visually impaired person who is gripping the grip portion 3. A specific example of the notification to the visually impaired person by the vibration of the vibration generator 50 will be described later.

The battery 60 is composed of a secondary battery for storing electric power for the camera 20, the short-range wireless communication device 40, the vibration generator 50, and the control device 80.

The charging socket 70 is a portion to which a charging cable is connected when storing electric power in the battery 60. For example, the charging cable is connected when the visually impaired person charges the battery 60 from a household power source while at home.

Figure 4:
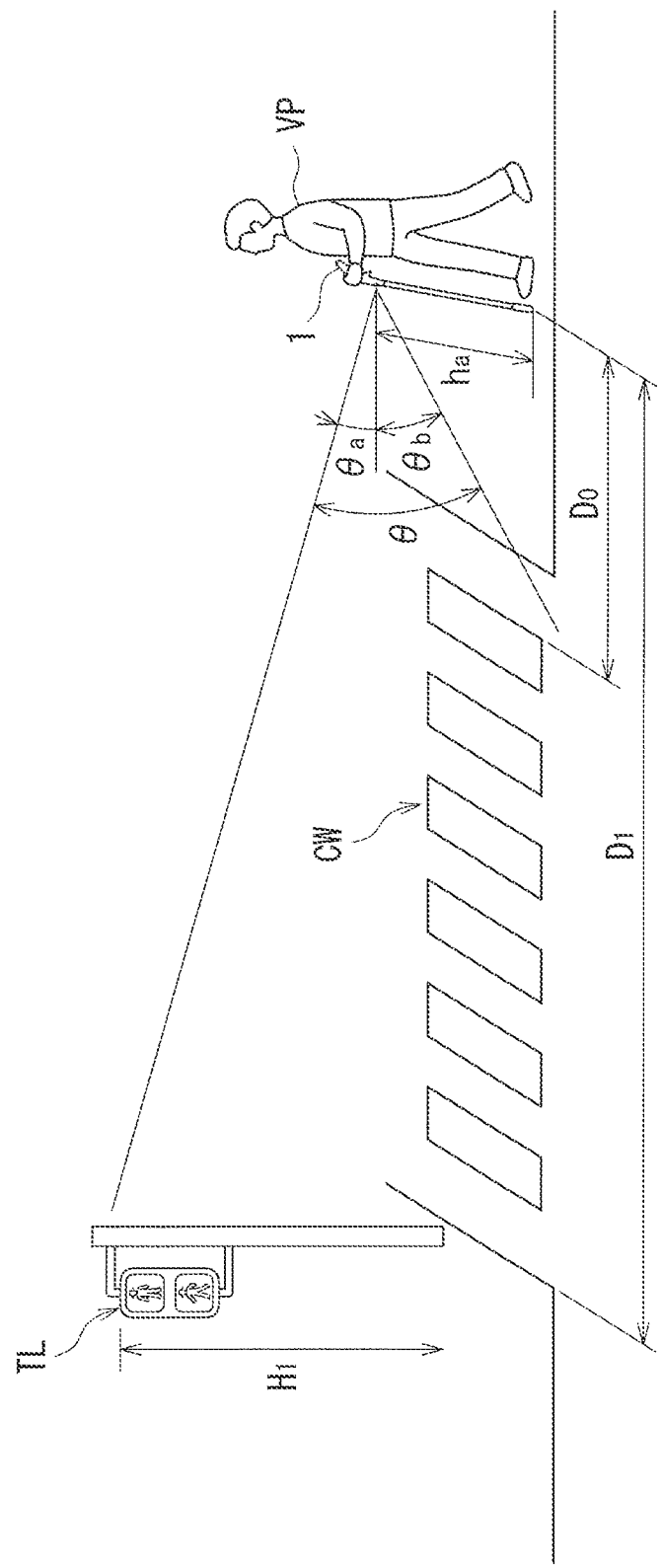
FIG. 4 is a diagram for explaining a viewing angle required when using a wide-angle camera.

Here, the viewing angle required for the above-mentioned camera 20 will be described. FIG. 4 is a diagram for explaining a viewing angle θ required when using the wide-angle camera 20, and shows a state at the time when the visually impaired person VP holding the white cane 1 reaches the front of a pedestrian crossing CW.

Here, a height position (distance from the ground) of the camera 20 in the state where the visually impaired person VP is stopped in front of the pedestrian crossing CW is $h_a$.

A height position (distance from the ground) of the traffic light TL is $H_1$. A distance from a stopping position of the visually impaired person VP to the pedestrian crossing CW is $D_0$. A distance from a stopping position of the visually impaired person VP to the traffic light TL is $D_1$. In this case, an elevation angle $\theta_a$ required for the camera 20 to photograph (detect) the traffic light TL is expressed by the following equation (1). A depression angle $\theta_b$ required for the camera 20 to photograph (detect) the pedestrian crossing CW is expressed by the following equation (2).

Equation 1

$$\theta_a = \tan^{-1}\left(\frac{H_1 - h_a}{D_1}\right) \quad (1)$$

Equation 2

$$\theta_b = \tan^{-1}\left(-\frac{h_a}{D_0}\right) \quad (2)$$

Therefore, when the visually impaired person VP stops in front of the pedestrian crossing CW, the viewing angle $\theta$ of the camera 20 required to photograph both the traffic light TL and the pedestrian crossing CW is expressed by the following equation (3).

Equation 3

$$\theta = |\theta_a| + |\theta_b| = \tan^{-1}\left(\frac{H_1 - h_a}{D_1}\right) + \tan^{-1}\left(\frac{h_a}{D_0}\right) \quad (3)$$

As a general value, when the height position $H_1$ of the traffic light TL is 2.7 to 3.2 m, the distance $D_0$ from the stopping position of the visually impaired person VP to the pedestrian crossing CW is 0.8 m, and the distance $D_1$ from the stopping position of the visually impaired person VP to the traffic light TL is 5 m, a minimum viewing angle $\theta_{min}$ required for the camera 20 is about 75°. In addition, considering the variation in the orientation of the camera 20 due to the difference in how the white cane 1 is held by the visually impaired person VP, the viewing angle $\theta$ of the camera 20 required to photograph both the traffic light TL and the pedestrian crossing CW is 75+$\theta_c$° ($\theta_c$ is an arbitrary value).

Figure 5:
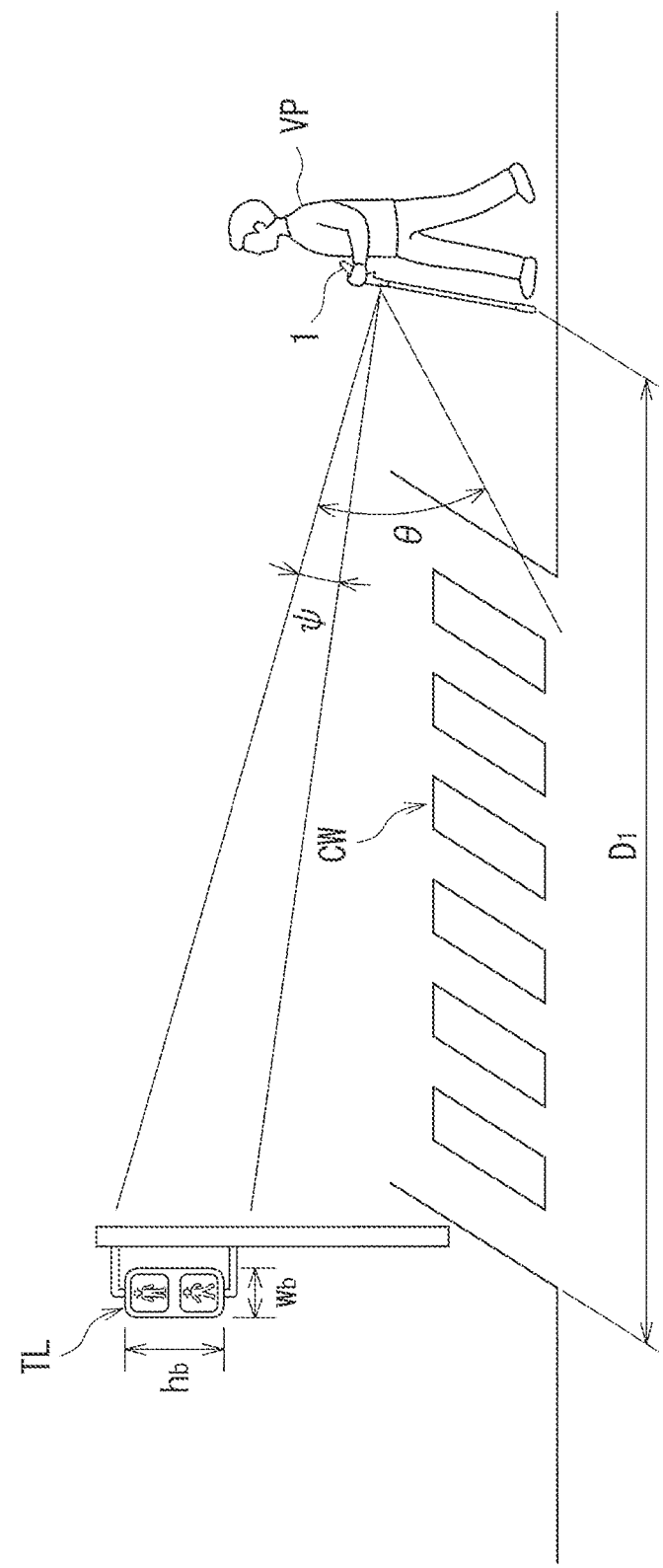
FIG. 5 is a diagram for explaining the number of representation pixels of a traffic light in the prior art when a wide-angle camera is used.

Next, the recognition of the traffic light TL taken by the camera 20 will be described. FIG. 5 is a diagram for describing the number of expression pixels of the traffic light TL in the prior art when the wide-angle camera 20 is used, and similarly to FIG. 4, FIG. 5 shows a state in which the visually impaired person VP holding the white cane 1 reaches the front of the pedestrian crossing CW.

Here, the height dimension of the traffic light TL is $h_b$ and the width dimension is $w_b$. This traffic light TL has the height dimension $h_b$ longer than the width dimension $w_b$.

When a spherical lens is used as the lens of the camera 20, a viewing angle $\psi$ including the traffic light TL when the traffic light TL is photographed is expressed by the following equation (4).

Equation 4

$$\psi = \tan^{-1}\left(\frac{w_b}{2D_1}\right) \quad (4)$$

Here, assuming that the viewing angle of the camera 20 described above is $\theta$ and the number of short-side pixels of the captured image is $w_c$, the number of pixels $w_s$ that expresses the traffic light TL can be obtained by the following equation (5).

Equation 5

$$w_s = c(x, y) \times w_c \times \frac{\psi}{\theta} \quad (5)$$

Here, c is a distortion correction coefficient (c>0) using a wide-angle lens, and is expressed as a function of pixel coordinates (x, y) in the captured image.

As a general value, when the width dimension $w_b$ of the traffic light TL is 0.4 m, the distance $D_1$ from the stopping position of the visually impaired person VP to the traffic light TL is 20 m (assuming the pedestrian crossing of a five-lane road), the viewing angle $\theta$ of the camera 20 is 180°, and the correction coefficient c is 1, $w_s=3.18\times10^{-3}w_c$ is obtained, and when the number of short side pixels $w_c$ is 2,084, the traffic light TL is represented by a very small number of pixels such as 6.5 pixels.

From the above, in order to photograph (capture) the traffic light TL with the camera 20, it is necessary to increase the resolution at the time of photographing and decrease the viewing angle of the camera 20. Therefore, the performances required for the recognition of the pedestrian crossing CW and the recognition of the traffic light TL by the captured image of the camera 20 are in conflict with each other, and an algorithm that satisfies both performances has been required.

In order to meet this demand, the present embodiment enables two types of photographing with different resolutions, thereby making it possible to achieve both recognition of the pedestrian crossing CW and recognition of the traffic light TL (details will be described later).

The control device 80 includes, for example, a processor such as a central processing unit (CPU), a read-only memory (ROM) for storing a control program, a random-access memory (RAM) for temporarily storing data, an input/output port, and the like.

The control device 80 has, as its functional units, an information receiving unit 81, a first image acquisition operation instruction unit 82, a traffic light recognition determination unit 83, a second image acquisition operation instruction unit 84, and a traffic light state determination unit 85, a switching recognition unit 86, a white line recognition unit 87, and an information transmission unit 88. The outline of the functions of each of these parts will be described below. The details of the process operation in each part will be described later.

The information receiving unit 81 receives the information of the image taken by the camera 20 from the camera 20 via the short-range wireless communication device 40 at predetermined time intervals.

When there is the pedestrian crossing CW in front of the visually impaired person VP in the walking direction, in the state in which there is both the pedestrian crossing CW and the traffic light TL in the field of view of the camera 20, the first image acquisition operation instruction unit 82 makes the camera 20 perform the first image acquisition operation. The details of this first image acquisition operation will be described later.

The traffic light recognition determination unit 83 determines whether the presence of the traffic light TL is recognized in the image acquired by the first image acquisition operation. The details of this determination operation will also be described later.

The second image acquisition operation instruction unit 84 causes the camera 20 to perform a second image acquisition operation when it is determined by the traffic light recognition determination unit 83 that the presence of the traffic light TL is not recognized. The second image acquisition operation will be described in detail later, and is an image acquisition operation having a higher resolution than the first image acquisition operation.

The traffic light state determination unit 85 determines whether the state of the traffic light TL recognized by the image acquired by the first image acquisition operation or the image acquired by the second image acquisition operation is a red light (stopping instruction state) or a green light (crossing permission state). A general object detection algorithm or rule-based algorithm is used for determining the state of the traffic light TL (color detection) performed by the traffic light state determination unit 85.

The switching recognition unit 86 recognizes that the state of the traffic light TL determined by the traffic light state determination unit 85 is switched from the red light to the green light. When the switching of the light is recognized, the switching recognition unit 86 transmits the switching signal to the information transmission unit 88. This switching signal is transmitted from the information transmission unit 88 to the vibration generator 50. The vibration generator 50 vibrates in a predetermined pattern in conjunction with receiving this switching signal, and issues a notification (notification to start crossing) to the visually impaired person VP that the crossing of the pedestrian crossing CW is allowed as a result of the traffic light TL changing from the red light to the green light.

The white line recognition unit 87 recognizes the white line of the pedestrian crossing CW from the image acquired by the first image acquisition operation. Specifically, among the plurality of white lines constituting the pedestrian crossing CW, a boundary box is set for those that are confirmed to be white lines. As will be described later, this boundary box is used for identifying the stopping position of the visually impaired person VP and the position of the traffic light TL, identifying the traveling direction when the visually impaired person VP crosses the pedestrian crossing CW, and determining the completion of crossing the pedestrian crossing CW. Details of the above will be described later.

Walking Support Operation

Next, the walking support operation by the walking support system 10 configured as described above will be described. First, the outline of the present embodiment will be described.

Outline of Present Embodiment

Here, the time while the visually impaired person VP is walking is represented by $t \in [0, T]$, and the variable (state variable) representing the state of the visually impaired person VP is $s \in R^T$. The state variable at time t is represented by an integer of $s_t \in [0, 1, 2]$, and each represent a walking state ($s_t$=0), a stopped state ($s_t$=1), and a crossing state ($s_t$=2). The walking state referred here is assumed to be, for example, a state in which the visually impaired person VP is walking toward an intersection (an intersection with the traffic light TL and the pedestrian crossing CW). In addition, the stopped state is assumed to be a state in which the visually impaired person VP reaches the front of the pedestrian crossing CW and is stopped (in a state of not walking) by waiting for a traffic light (waiting for the red light to switch to the green light). Further, the crossing state is assumed to be a state in which the visually impaired person VP is crossing the pedestrian crossing CW.

This embodiment proposes an algorithm for finding an output $y \in R^T$ for the purpose of supporting the walking of the visually impaired person VP, when an image $X_t \in R^{w_0 \times h_0}$ ($w_0$ and $h_0$ represent the vertical and horizontal image sizes of the image, respectively) taken by the camera 20 at time t is input. Here, the output that supports walking of the visually impaired person VP is expressed by an integer of $y_t \in [1, 2, 3, 4]$, and each represent a stopping instruction ($y_t$=1), a walking instruction ($y_t$=2), a right deviation warning ($y_t$=3), and a left deviation warning ($y_t$=4). In the following explanation, the stopping instruction may be referred to as a stopping notification. In addition, the walking instruction may be referred to as a walking notification or a crossing notification. These instructions (notifications) and warnings are given to the visually impaired person VP by the vibration pattern of the vibration generator 50. The visually impaired person VP knows the relationship between the instruction and the warning and the vibration pattern of the vibration generator 50 in advance, and knows the type of the instruction and the warning by sensing the vibration pattern of the vibration generator 50 from the grip portion 3.

Further, as will be described later, there are functions for determining the transition of a variable s representing the state of the visually impaired person VP (hereinafter referred to as state transition functions) $f_0$, $f_1$, $f_2$, and a state transition function $f_3$ that determines deviation (deviation to the left-right direction) from the pedestrian crossing CW. These state transition functions $f_0$ to $f_3$ are stored in the ROM (the storage unit in the present disclosure). Specific examples of these state transition functions $f_0$ to $f_3$ will be described later.

Overview of Output Variable y and State Transition Function $f_i$

The output $y_t \in [1, 2, 3, 4]$ that supports the walking of the visually impaired person VP described above will be described.

As described above, the output $y_t$ includes four types of outputs that are the stopping instruction ($y_t$=1), the walking instruction ($y_t$=2), the right deviation warning ($y_t$=3), and a left deviation warning ($y_t$=4), for the purpose of walking support of the visually impaired person VP.

Figure 6:
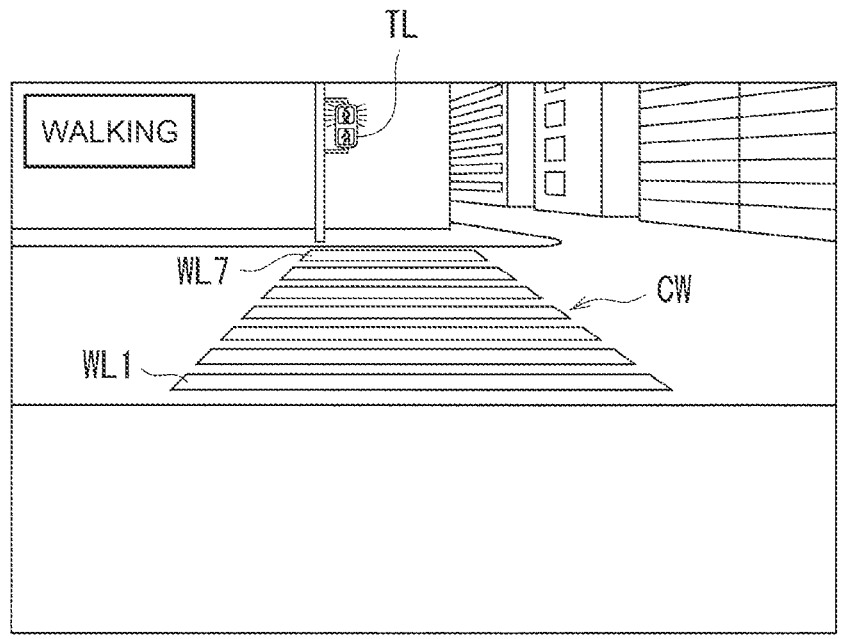
FIG. 6 is a diagram showing an example of an image taken by a camera when a visually impaired person is in a walking state toward a pedestrian crossing.

The stopping instruction ($y_t$=1) notifies the visually impaired person VP to stop walking when the walking visually impaired person VP reaches the front of the pedestrian crossing CW. For example, when the image captured by the camera 20 is a state indicated in FIG. 6 (a diagram showing an example of an image taken by the camera 20 when the visually impaired person VP is in the walking state toward the pedestrian crossing CW), since the distance to the pedestrian crossing CW is relatively long, the stopping instruction ($y_t$=1) is not carried out and the walking state ($s_t$=0) of the visually impaired person VP is continued. When the image captured by the camera 20 is in the state shown in FIG. 7 (a diagram showing an example of an image taken by the camera 20 when the visually impaired person VP reaches the pedestrian crossing CW), since it is the timing when the visually impaired person VP reaches the front of the pedestrian crossing CW, the stopping instruction ($y_t$=1) is output to notify the visually impaired person VP to stop walking. The determination of whether the condition for issuing the stopping instruction ($y_t=1$) is satisfied (determination based on the calculation result of the state transition function) will be described later.

The walking instruction ($y_t=2$) notifies the visually impaired person VP of instructing walking (crossing the pedestrian crossing CW) when the traffic light TL is switched from the red light to the green light. For example, in the situation where the visually impaired person VP is in the stopped state ($s_t=1$) in front of the pedestrian crossing CW, when the traffic light TL switches from the red light to the green light based on the image taken by the camera 20, the walking instruction ($y_t=2$) is output to notify the visually impaired person VP to start crossing the pedestrian crossing CW. The determination of whether the condition for issuing the walking instruction ($y_t=2$) is satisfied (determination based on the calculation result of the state transition function) will be described later.

Then, in the present embodiment, the timing of issuing this walking instruction ($y_t=2$) is the timing at which the state of the traffic light TL is switched from the red light to the green light. That is, even if the traffic light TL has already turned green when the visually impaired person VP reaches the pedestrian crossing CW, the walking instruction ($y_t=2$) is not given, and at the timing at which the traffic light TL turns green after the traffic light TL temporarily turns red, the walking instruction ($y_t=2$) is given. As a result, when the visually impaired person VP crosses the pedestrian crossing CW, it is possible to secure a sufficient time during which the traffic light TL is green, and it is difficult to cause a situation where the traffic light TL switches from the green light to the red light while the visually impaired person VP is crossing the pedestrian crossing CW.

Figure 8:
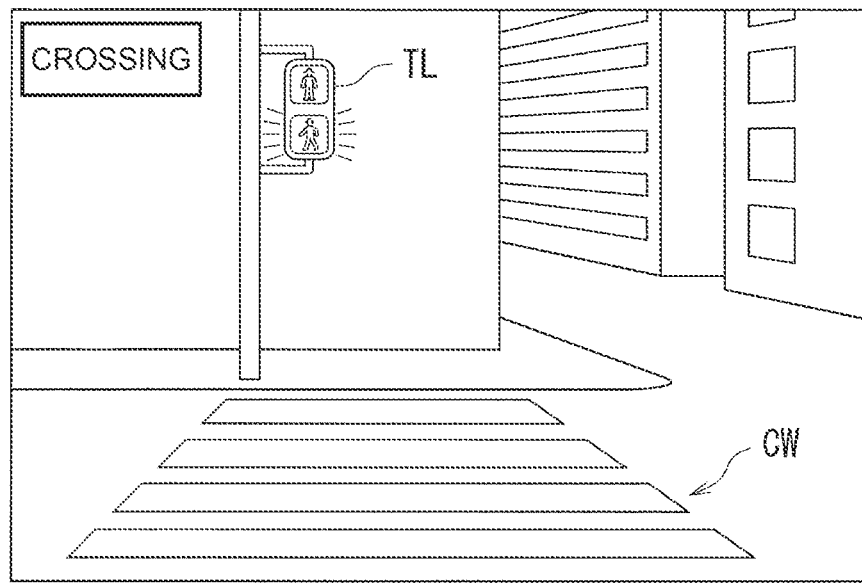
FIG. 8 is a diagram showing an example of an image taken by the camera when the visually impaired person is in a crossing state of the pedestrian crossing.
Figure 9:
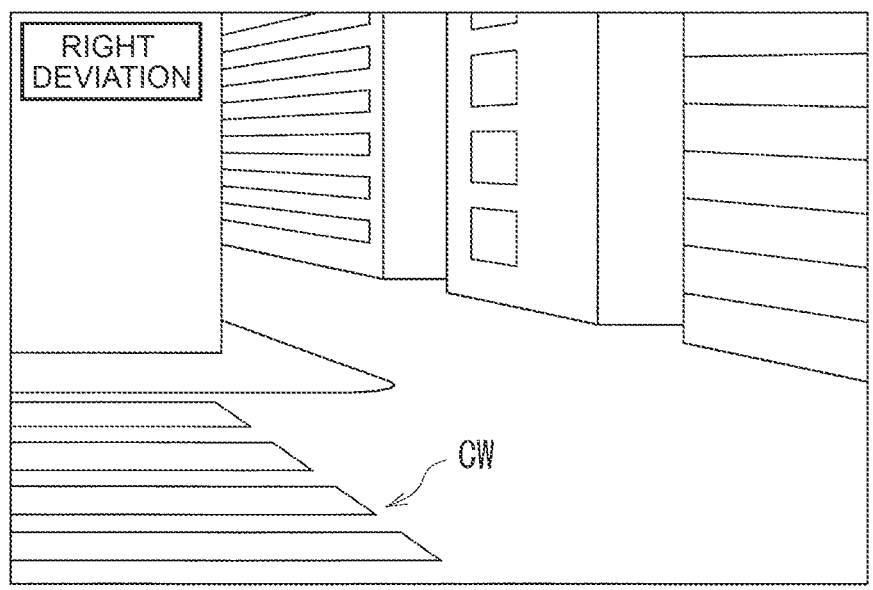
FIG. 9 is a diagram showing an example of an image taken by the camera when the visually impaired person who is in the crossing state of the pedestrian crossing is walking in a direction deviating to a right side of the pedestrian crossing.

The right deviation warning ($y_t=3$) warns the visually impaired person VP that there is a risk of deviating from the pedestrian crossing CW to the right side, when the visually impaired person VP crossing the pedestrian crossing CW is walking in the direction deviating from the pedestrian crossing CW to the right side. For example, when the image captured by the camera 20 is in a state indicated in FIG. 8 (a diagram showing an example of an image taken by the camera 20 when the visually impaired person VP is in the crossing state of the pedestrian crossing CW), in a situation where the visually impaired person VP is in the crossing state ($s_t=2$) of the pedestrian crossing CW, when the image captured by the camera 20 is a state shown in FIG. 9 (a diagram showing an example of an image taken by the camera 20 when the visually impaired person VP who is crossing the pedestrian crossing CW is in the crossing state in the direction deviating to the right side of the pedestrian crossing CW), since the visually impaired person VP is walking in the direction deviating from the pedestrian crossing CW to the right side, the right deviation warning ($y_t=3$) is output to warn the visually impaired person VP.

Figure 10:
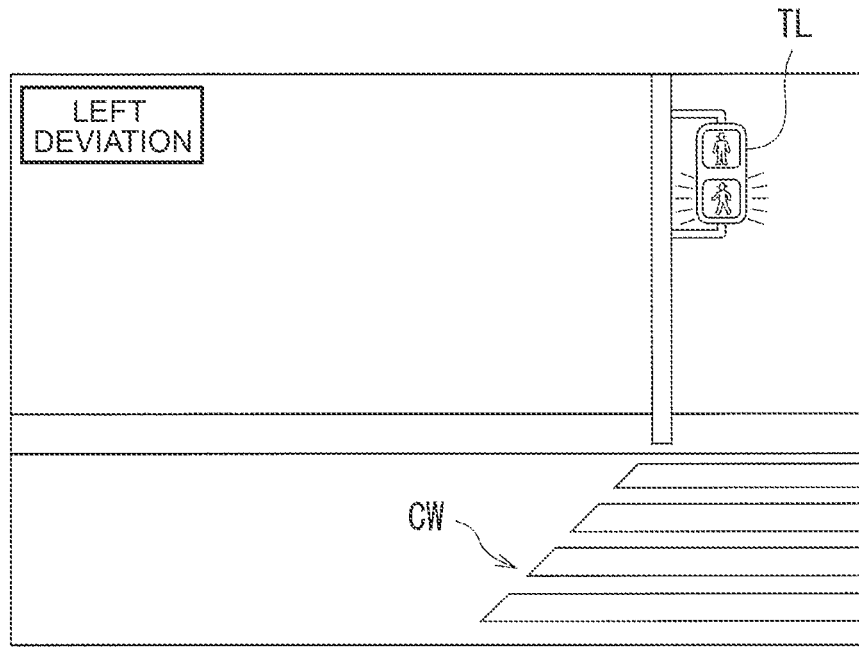
FIG. 10 is a diagram showing an example of an image taken by the camera when the visually impaired person who is in the crossing state of the pedestrian crossing is walking in a direction deviating to a left side of the pedestrian crossing.

The left deviation warning ($y_t=4$) warns the visually impaired person VP that there is a risk of deviating from the pedestrian crossing CW to the left side, when the visually impaired person VP crossing the pedestrian crossing CW is walking in the direction deviating from the pedestrian crossing CW to the left side. For example, when the image taken by the camera 20 is in the state shown in FIG. 8, in a situation where the visually impaired person VP is in the crossing state ($s_t=2$) of the pedestrian crossing CW, when the image captured by the camera 20 is a state shown in FIG. 10 (a diagram showing an example of an image taken by the camera 20 when the visually impaired person VP who is in the crossing state of the pedestrian crossing CW is walking in the direction deviating to the left side of the pedestrian crossing CW), since the visually impaired person VP is walking in the direction deviating from the pedestrian crossing CW to the left side, the left deviation warning ($y_t=4$) is output to warn the visually impaired person VP.

The determination of whether the conditions for issuing the right deviation warning ($y_t=3$) and the left deviation warning ($y_t=4$) are satisfied (determination based on the calculation result of the state transition function) will also be described later.

First and Second Image Acquisition Operations

As described above, the wide-angle camera 20 is required to capture both the white line of the pedestrian crossing CW (the white line on the foremost side) and the traffic light TL with the camera 20 built in the white cane 1, in a situation in which the visually impaired person VP reaches the front of the pedestrian crossing CW. When the visually impaired person VP is walking, there is a need to recognize moving objects (bicycles, automobiles, and the like) around the visually impaired person VP, and capture various recognition targets in which the relative positions change as the visually impaired person VP is walking and perform object detection at high speed. In order to realize this, there is a limit to the resolution of the camera 20. In this way, when a relatively wide field of view (a relatively wide field of view for capturing both the pedestrian crossing CW and the traffic light TL) is realized by the camera 20 having a limited resolution (the resolution is limited in order to increase the object detection speed), since an occupied area of the traffic light TL with respect to the entire image is small and the resolution is also low in the image taken by the camera 20, there is a case in which it is not possible to recognize the presence of the traffic light TL (the position of the traffic light TL) and the state of the traffic light TL (whether it is a green light or a red light) with high accuracy from the information in this image.

Therefore, in the present embodiment, when the pedestrian crossing CW and the traffic light TL are captured (first image acquisition operation) by the camera 20 in the situation in which the visually impaired person VP reaches the front of the pedestrian crossing CW, when the presence of the traffic light TL cannot be recognized and the state (whether it is a green light or a red light) cannot be recognized, an image is taken (the second image acquisition operation with high resolution is performed) in which the recognition accuracy of the presence of the traffic light TL is higher than that of the first image acquisition operation so that the presence of the traffic light TL can be recognized. The outline of this process will be described below.

Figure 7:
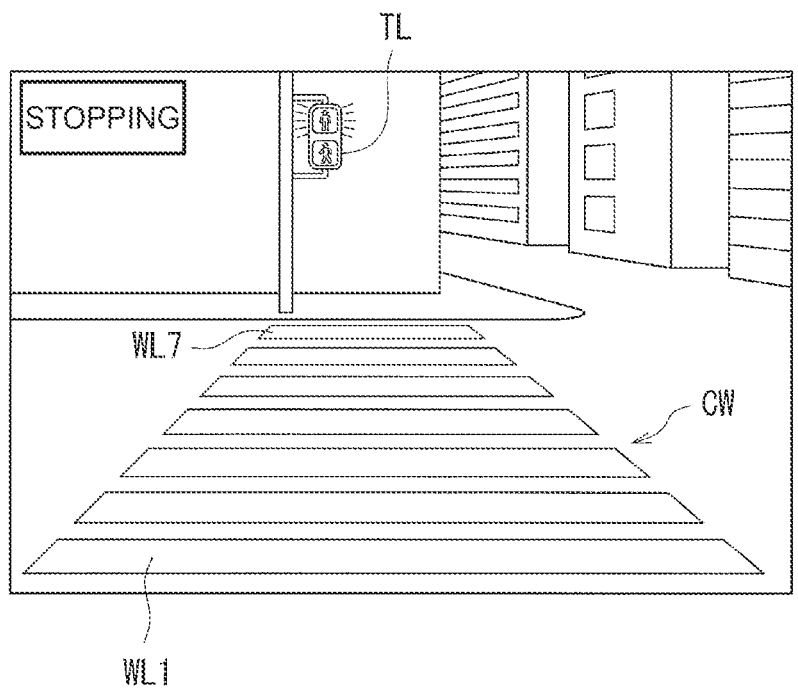
FIG. 7 is a diagram showing an example of an image taken by the camera when the visually impaired person reaches the pedestrian crossing.

In a situation where the visually impaired person VP is in the stopped state ($s_t=1$) in front of the pedestrian crossing CW, the image captured (first image acquisition operation) by the camera 20 is acquired as shown in FIG. 7. Then, when both the pedestrian crossing CW and the traffic light TL can be recognized in this acquired image, the crossing notification is performed according to the state of the recognized traffic light TL. Here, the recognition of the pedestrian crossing CW means that at least the white line WL1 on the foremost side among the plurality of white lines of the pedestrian crossing CW is recognized. Further, here, the recognition of the traffic light TL means that the position and state (whether it is a green light or a red light) of the traffic light TL are recognized.

Figure 11:
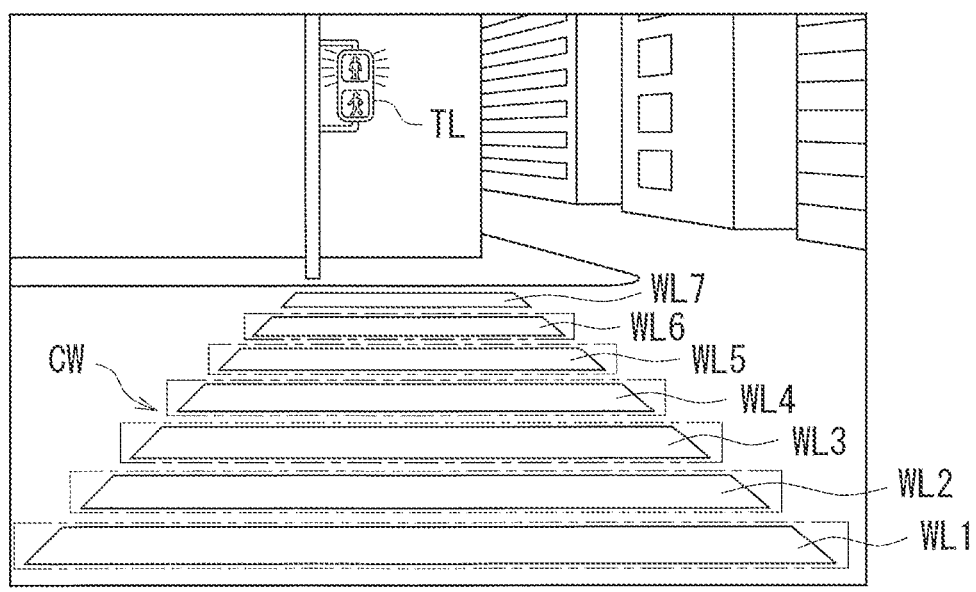
FIG. 11 is a diagram for explaining a white line boundary box of the pedestrian crossing set in an image taken by the camera when the visually impaired person reaches the front of the pedestrian crossing.

In contrast, when the traffic light TL cannot be recognized in the acquired image, a boundary box is set for each white line of the pedestrian crossing CW recognized by the white line recognition unit 87, as shown in FIG. 11. In the image shown in FIG. 11, a white line WL7 positioned at the farthest position among the white lines WL1 to WL7 of the pedestrian crossing CW is not recognized, and the other white lines WL1 to WL6 are recognized. Thus, FIG. 11 shows a state in which the boundary boxes are set for these white lines WL1 to WL6. As described above, the reliability of recognition of the white lines WL1 to WL6 is enhanced by not setting the boundary box for the white line (white line WL7) that is not determined to be the white line.

Figure 12:
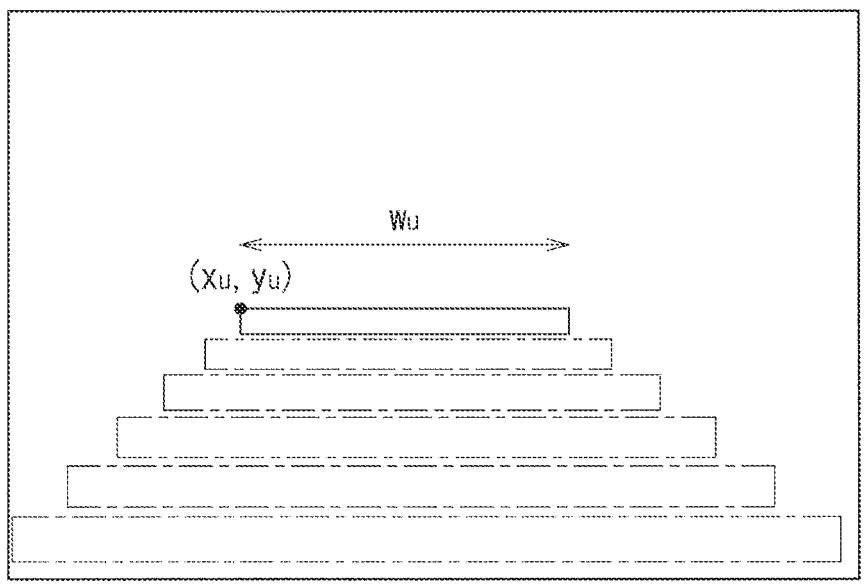
FIG. 12 is a diagram for explaining a specific operation of the boundary box of the white line at the farthest position among the recognized white lines of the pedestrian crossing.
Figure 13:
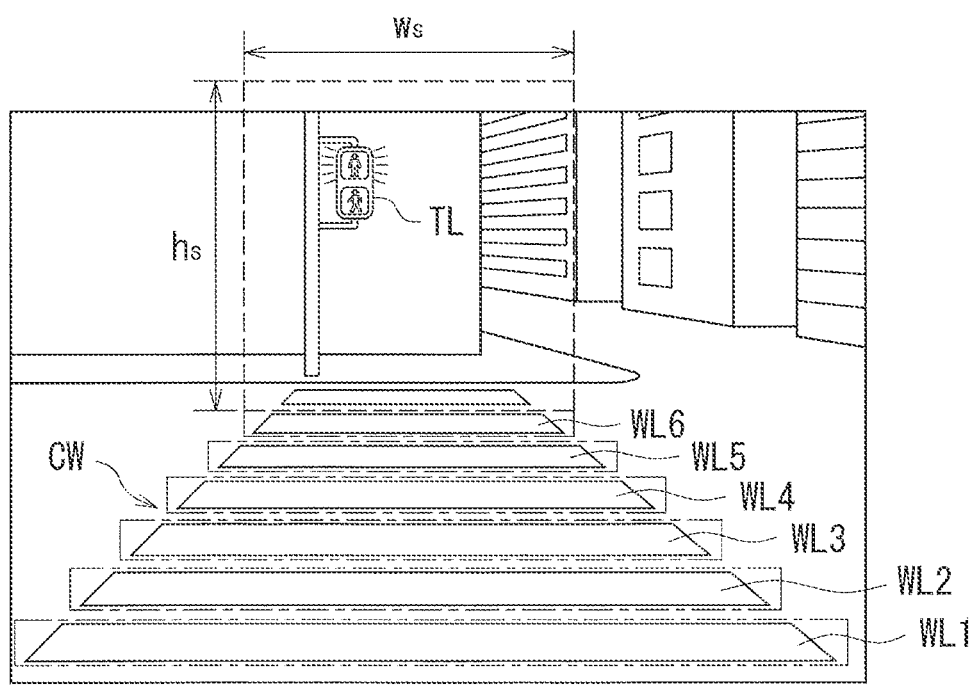
FIG. 13 is a diagram showing a crop range including the traffic light.

Then, in estimating the presence region of the traffic light TL, among the boundary boxes set for the recognized white lines WL1 to WL6, $y_u$ in coordinates $P_u$ ($x_u$, $y_u$) in the image of the boundary box (the boundary box shown by the solid line in FIG. 12) at the farthest position is identified. As shown in FIG. 13, a quadrangle (a quadrangle in which the width dimension is $w_s$, the height dimension is $h_s$) tangent to an upper side of the boundary box (the boundary box set on the white line WL6 positioned at the farthest position among the recognized white lines WL1 to WL6). This outputs a crop range $\zeta=(t, x_u, y_u, w_s, h_s)^T$ serving as the presence region of the traffic light TL. At this time, the crop range is $w_s=h_s$. That is, the crop range is a square. This makes it possible to improve the accuracy of object detection when using a model based on a convolutional neural network (CNN). As described above, when the traffic light TL cannot be recognized in the image acquired by the first image acquisition operation, the crop range for estimating the presence region of the traffic light TL is defined.

Next, the second image acquisition operation that is performed when the traffic light TL cannot be recognized in the image acquired by the first image acquisition operation will be described.

In this second image acquisition operation, photographing is performed at a higher resolution than in the first image acquisition operation. As a result, the value of a traffic light representation pixel number $w_s$ in the above equation (5) is increased to increase the recognition accuracy of the presence of the traffic light TL (the position of the traffic light TL) and the state of the traffic light TL (whether it is a green light or a red light).

The second image acquisition operation for improving the recognition accuracy of the presence of the traffic light TL and the state of the traffic light TL is not limited to the above-mentioned high-resolution capturing. A camera with a small viewing angle (in the present disclosure, the second image acquisition unit) may be provided, the camera (in the present disclosure, the first image acquisition unit) 20 having a large viewing angle may capture an image in the first image acquisition operation, a camera with a small viewing angle may be used to take a picture around the traffic light TL in the second image acquisition operation, and the occupied area of the traffic light TL may be expanded for the entire image, so as to increase the recognition accuracy of the presence of the traffic light TL and the state of the traffic light TL. Further, one camera 20 may be provided with a lens exchange mechanism, and different lenses may be used for the first image acquisition operation and the second image acquisition operation. In this case, the first image acquisition unit referred to in the present disclosure is configured by using a lens having a large viewing angle, and the second image acquisition unit referred to in the present disclosure is configured by using a lens having a small viewing angle.

Then, the crop range setting operation is performed according to the position of the traffic light TL described above, and $\zeta=(x_u, y_u, w_s, h_s)^T$ is input to this crop range. Thereafter, the position of the crop range is corrected by the following equation (6), in consideration of the influence of the difference in resolution (shooting resolution) and the like (in addition, the influence of the difference in camera position), on the image taken by the second image acquisition operation.

Equation 6

$$\zeta'=A(\zeta-o)+o' \quad (6)$$

Here, $\zeta$ is the crop range before the position correction, and $\zeta'$ is the crop range after the position correction. o is the focal coordinate of the camera 20 before the position correction, and o' is the focal coordinate after the position correction. Further, A is a coordinate conversion matrix based on the difference in the orientation of the central axes when two cameras are used.

Here, a traffic light recognition function for determining whether the traffic light TL can be recognized in the image acquired by the first image acquisition operation will be described.

After the pedestrian crossing CW is detected in the image acquired by the first image acquisition operation, the operation of searching for the traffic light TL is performed. In the situation in which the previous time is in the stopped state ($s_t=1$), a traffic light recognition function $g_1(t+1)$ is expressed as Equation (7).

Equation 7

$$g_1(t+1)=s(t+1) \quad (7)$$

For s(t+1) in this equation (7), "1" is obtained when the traffic light TL is recognized at time t+1, and "0" is obtained in other cases. Therefore, when $g_1(t+1)=1$, it means that the traffic light TL can be recognized in the image acquired by the first image acquisition operation, and the state of the traffic light TL (whether it is a green light or a red light) can be recognized without performing the second image acquisition operation. In contrast, when $g_1(t+1)=0$, it means that the traffic light TL cannot be recognized in the image acquired by the first image acquisition operation, and the second image acquisition operation in which the recognition accuracy of the presence of the traffic light TL is improved is executed.

Feature Amount Used for Walking Support

Next, the feature amount used for walking support for the visually impaired person VP will be described. In order to appropriately give various notifications to the visually impaired person VP such as a notification to stop walking in front of the pedestrian crossing CW and the notification to start crossing thereafter, the position of the pedestrian crossing CW needs to be accurately recognized (the position of the white line WL1 on the foremost side of the pedestrian crossing CW) and the state of the traffic light TL (whether it is a green light or a red light) based on the information from the camera 20. That is, it is necessary to construct a model formula that reflects the position of the white line WL1 and the state of the traffic light TL, so that it is possible to grasp the current situation of the visually impaired person VP following this model formula.

Figure 14:
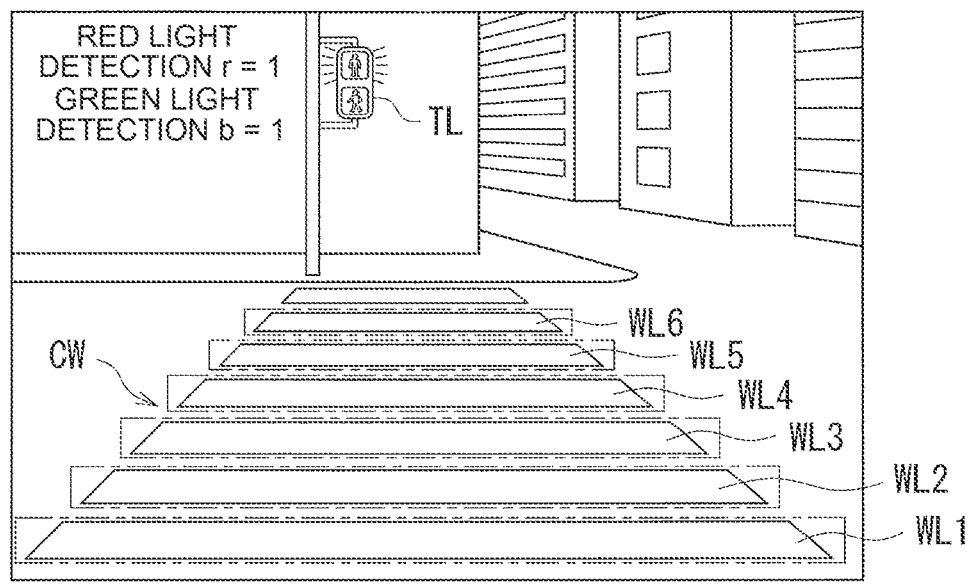
FIG. 14 is a diagram showing an image of the pedestrian crossing and the traffic light that are recognized.
Figure 15:
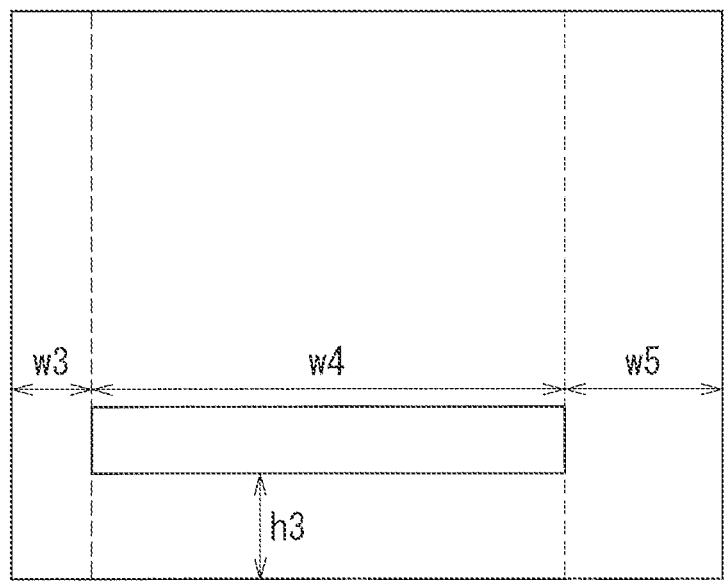
FIG. 15 is a diagram for explaining the dimensions of each part of the boundary box of the white line on the foremost side among the recognized white lines of the pedestrian crossing.

FIG. 14 and FIG. 15 show an outline of the feature amounts $[w_3, w_4, w_5, h_3, r, b]^T \square R^6$ used for walking support for the visually impaired person VP. r and b represent the detection results (0: undetected, 1: detected) of the state of the traffic light TL (red light and green light), respectively. Further, $w_3$, $w_4$, $w_5$, and $h_3$ are defined as shown in FIG. 15 by using the boundary box for the white line WL1 at the foremost position among the white lines WL1 to WL6 of the pedestrian crossing CW recognized by the white line recognition unit 87. That is, $w_3$ is the distance from the left edge of the image to the left edge of the boundary box (corresponding to the left edge of the white line WL1), $w_4$ is the width dimension of the boundary box (corresponding to the width dimension of the white line WL1), $w_5$ is the distance from the right edge of the image to the right edge of the boundary box (corresponding to the right edge of the white line WL1), and $h_3$ is the distance from the lower end of the image to the lower end of the boundary box (corresponding to the front side of the white line WL1).

When the function to detect pedestrian crossing CW and traffic light TL using deep learning is g, when the boundary box of the pedestrian crossing CW and the traffic light TL predicted using the image $X_t \square R^{w0 \times h0}$ taken by the camera 20 at time t is expressed as $g(Xt)$, the feature amount required to support the walking of the visually impaired person VP can be expressed by the following equation (8).

Equation 8

$$j(t) = \{w_3^t, w_4^t, w_5^t, h_3^t, r^t, b^t\}^T = \phi \circ g(X_t) \qquad (8)$$

Here,

Equation 9

$$\phi: R^{p1 \times 4} \mapsto R^6 \qquad (9)$$

is an operator for extracting the feature amount j(t), is for performing post-processing on the g(Xt), and p1 is the maximum number of boundary boxes per frame.

State Transition Function

Next, the state transition function will be described. As described above, this state transition function is used to determine whether the conditions for notifying the stopping instruction ($y_t=1$), the walking instruction ($y_t=2$), the right deviation warning ($y_t=3$), and the left deviation warning ($y_t=4$) the following are satisfied.

The state amount (state variable) $s_{t+1}$ at time t+1 can be expressed by the equation (10) bellow by using time history information $J=\{j(0), j(1), \ldots j(t)\}$ for the feature amount of the pedestrian crossing CW, the current state amount (state variable) $s_t$, and the image $X_{t+1}$ captured at time t+1.

Equation 10

$$s_{t+1} = f(J, s_t, X_{t+1}) \qquad (10)$$

The state transition function f in the equation (10) can be defined as the following equation (11) in accordance with the state amount at the current time.

Equation 11

$$f(J, s_t, X_{t+1}) = \begin{cases} f_0(J, X_{t+1}) & \text{if } s_t = 0 \text{ (walking)} \\ f_1(J, X_{t+1}) & \text{if } s_t = 1 \text{ (stopping)} \\ f_2(J, X_{t+1}) & \text{if } s_t = 2 \text{ (crossing)} \end{cases} \qquad (11)$$

That is, as the transition of walking of the visually impaired person VP, walking (for example, walking toward the pedestrian crossing CW)→stopping (for example, stopping in front of the pedestrian crossing CW)→crossing (for example, crossing the pedestrian crossing CW)→walking (for example, walking after completing crossing the pedestrian crossing CW) will be repeated. The state transition function for determining whether the condition for performing the stopping instruction ($y_t=1$) to the visually impaired person VP that is in the walking state ($s_t=0$) is satisfied is $f_0(J, X_{t+1})$. The state transition function for determining whether the condition for performing the crossing instruction ($y_t=2$) to the visually impaired person VP that is in the stopped state ($s_t=1$) is satisfied is $f_1(J, X_{t+1})$. The state transition function for determining whether the condition for issuing the walking (completion of crossing) notification to the visually impaired person VP that is in the crossing state ($s_t=2$) is satisfied is $f_2(J, X_{t+1})$. Further, as shown in the equation (19) described below, the state transition function for determining whether the condition for performing warning of deviation from the pedestrian crossing CW to the visually impaired person VP that is in the crossing state ($s_t=2$) is satisfied is $f_3(J, X_{t+1})$.

Hereinafter, the state transition function corresponding to each state amount (state variable) will be specifically described.

State Transition Function Applied in Walking State

The state transition function $f_0(j, X_{t+1})$ that is used when the state amount at the current time is the walking state ($s_t=0$) can be the following equations (12) to (14) by using the feature amount of the equation (8) described above.

Equation 12

$$f_0(J, X_{t+1}) = \qquad (12)$$
$$H(\alpha_1 - h_3^{t+1})H(w_4^{t+1} - \alpha_2) \times \delta\left(\sum_{i=T-t0}^{t} H(\alpha_1 - h_3^{t+1})H(w_4^{t+1} - \alpha_2)\right)$$

Equation 13

$$w_4^{t+1} = I_2^T\{\phi \circ g(X_{t+1})\} \qquad (13)$$

Equation 14

$$h_3^{t+1} = I_4^T\{\phi \circ g(X_{t+1})\} \qquad (14)$$

Here, H is a Heaviside function and δ is a Delta function. Further, $\alpha_1$ and $\alpha_2$ are parameters used as determination criteria, and t0 is a parameter that specifies the past state to be used. Also, $I_2=\{0, 1, 0, 0, 0, 0\}^T$ and $I_4=\{0, 0, 0, 1, 0, 0\}^T$. This equation (12) is a first state transition function of the present disclosure (the first state transition function for determining whether the condition for issuing the notification to stop walking to the pedestrian in a walking state in front of the pedestrian crossing is satisfied).

By using equation (12), "1" is obtained only when the conditions of $\alpha_1 > h_3$ and $w_4 > \alpha_2$ are not satisfied in the past t0 time and are satisfied for the first time at time t+1, and "0" is obtained in other cases. In other words, when $\alpha_1 > h_3$ is satisfied, the white line WL1 (the lower end of the white line boundary box) positioned at the foremost position of the pedestrian crossing CW is positioned at the feet of the visually impaired person VP, and when $w_4 > \alpha_2$ is satisfied, "1" is obtained when it is determined that the white line WL1 extends in the direction orthogonal to the traveling direction of the visually impaired person VP (the width dimension of the boundary box of the white line exceeds the predetermined dimension).

When "1" is obtained in the equation (12) in this way, assuming that the condition for giving the stopping instruction ($y_t=1$) is satisfied, the stopping instruction (for example, the stopping instruction for walking in front of the pedestrian crossing CW; the stopping notification) will be given to the visually impaired person VP who is in the walking state.

Further, in the present embodiment, the condition that the pedestrian crossing CW is at the feet of the visually impaired person VP is not only $\alpha_1 > h_3$, but also the constraint ($w_4 > \alpha_2$) of the width of the detected pedestrian crossing CW is added. Thus, false detection is suppressed when a pedestrian crossing other than the pedestrian crossing CW in the traveling direction the visually impaired person VP (such as a pedestrian crossing in the direction orthogonal to the traveling direction of the visually impaired person VP at an intersection) is included in the image $X_{t+1}$. That is, even when there are multiple pedestrian crossings with different crossing directions at road intersections, and the like, it is possible to distinguish the pedestrian crossing CW that the visually impaired person VP should cross (the pedestrian crossing CW in which the width dimension of the white line WL1 is relatively widely recognized since the white line WL1 extends in the direction that intersects the direction that the visually impaired person VP should cross) and other pedestrian crossings (pedestrian crossings in which the width dimension of the white line is relatively narrowly recognized). Thus, it is possible to accurately issue the notification to start crossing to the visually impaired person VP with high accuracy.

State Transition Function Applied in Stopped State

The state transition function $f_1(j, X_{t+1})$ that is used when the state amount at the previous time is the stopped state ($s_t=1$) can be the following equations (15) to (17).

Equation 15

$$f_1(J, X_{t+1}) = b^{t+1} \delta\left(\sum_{t=i-t0}^{t} r^j\right) \quad (15)$$

Equation 16

$$b^{t+1} = I_6^T \{\phi \circ g(X'_{t+1})\} \quad (16)$$

Equation 17

$$r^{t+1} = I_5^T \{\phi \circ g(X'_{t+1})\} \quad (17)$$

Here, $X'_{t+1}$ is an image $X'_{t+1}$ in which the recognition accuracy of the traffic light TL is sufficiently obtained by performing the first image acquisition operation or the second image acquisition operation described above. Further, $I_5 = \{0, 0, 0, 0, 1, 0\}^T$ and $I_6 = \{0, 0, 0, 0, 0, 1\}^T$. This equation (15) is a second state transition function of the present disclosure (the second state transition function for determining whether the condition for issuing the notification to start crossing the pedestrian crossing to the pedestrian in the stopped state in front of the pedestrian crossing is satisfied).

In equation (15), after the red light is detected at the past time t0, "1" is obtained only when the green light is detected for the first time at time t+1, and "0" is obtained in other cases.

When "1" is obtained in the equation (15) in this way, assuming that the condition for giving the walking (crossing) instruction ($y_t=2$) is satisfied, the crossing instruction (for example, the crossing instruction for crossing the pedestrian crossing; the crossing notification) will be given to the visually impaired person VP who is in the stopped state.

In addition, at a pedestrian crossing at an intersection without a traffic light, the state transition by the above logic may not be possible. In order to solve this problem, a new parameter t1>t0 may be introduced so that the state transitions to the walking state when it is determined that there is no state transition from the stopped state during the time t1.

State Transition Function Applied in Crossing State

The state transition function $f_2(j, X_{t+1})$ that is used when the state amount at the previous time is the crossing state ($s_t=2$) can be the following equation (18).

Equation 18

$$f_2(J, X_{t+1}) = \delta\left(\sum_{i=t-t0}^{t+1}(b^j + r^j + H(\alpha_1 - h_3^i)H(w_4^j - \alpha_2))\right) \quad (18)$$

This equation (18) is a fourth state transition function of the present disclosure (the fourth state transition function for determining whether the condition for issuing the notification that the crossing of the pedestrian crossing has been completed to the pedestrian in the crossing state of the pedestrian crossing is satisfied).

In the formula (18), "1" is obtained only when the traffic light TL and the pedestrian crossing CW at the feet of the visually impaired person VP cannot be detected even once between the past t-t0 to the current time t+1. In other cases, "0" will be obtained. That is, "1" is obtained only when the traffic light TL and the pedestrian crossing CW at the feet of the visually impaired person VP cannot be detected since the visually impaired person VP has crossed the pedestrian crossing CW.

When "1" is obtained in the equation (18) in this way, it is assumed that the condition for issuing the crossing completion notification is satisfied, and the crossing completion (crossing completion of the pedestrian crossing) notification is issued to the visually impaired person VP who is in the walking state.

State Transition Function That Determines Deviation From Pedestrian Crossing

The state transition function $f_3(j, X_{t+1})$ for determining the deviation from the pedestrian crossing CW while the visually impaired person VP is crossing the pedestrian crossing CW can be the following equations (19) to (21).

Equation 19

$$f_3(J, X_{t+1}) = H\left(\frac{\max(w_3^{t+1}, w_5^{t+1})}{w_0} - \alpha_3\right) \quad (19)$$

Equation 20

$$w_3^{t+1} = I_1^T \{\phi \circ g(X_{t+1})\} \quad (20)$$

Equation 21

$$w_5^{t+1} = I_3^T \{\phi \circ g(X_{t+1})\} \quad (21)$$

Here, $\alpha_3$ is a parameter used as a determination reference. Also, $I_1 = \{1, 0, 0, 0, 0, 0\}^T$ and $I_3 = \{0, 0, 1, 0, 0, 0\}^T$. This equation (19) is a third state transition function of the present disclosure (the third state transition function for determining whether the condition for issuing a warning of deviation from the pedestrian crossing to the pedestrian in the crossing state of the pedestrian crossing is satisfied).

In equation (19), "1" is obtained when a deviation amount of the detected position of the pedestrian crossing CW from the center of the frame is equal to or more than the allowable amount, and "0" is obtained in other cases. That is, "1" is obtained when the value of $w_3$ becomes larger than the predetermined value (in the case of left deviation) or when the value of $w_5$ becomes larger than the predetermined value (in the case of right deviation).

When "1" is obtained in the equation (19) in this way, the right deviation warning ($y_t$=3) or the left deviation warning ($y_t$=4) is issued.

Walking Support Operation

Next, the flow of the walking support operation by the walking support system 10 will be described.

Figure 16:
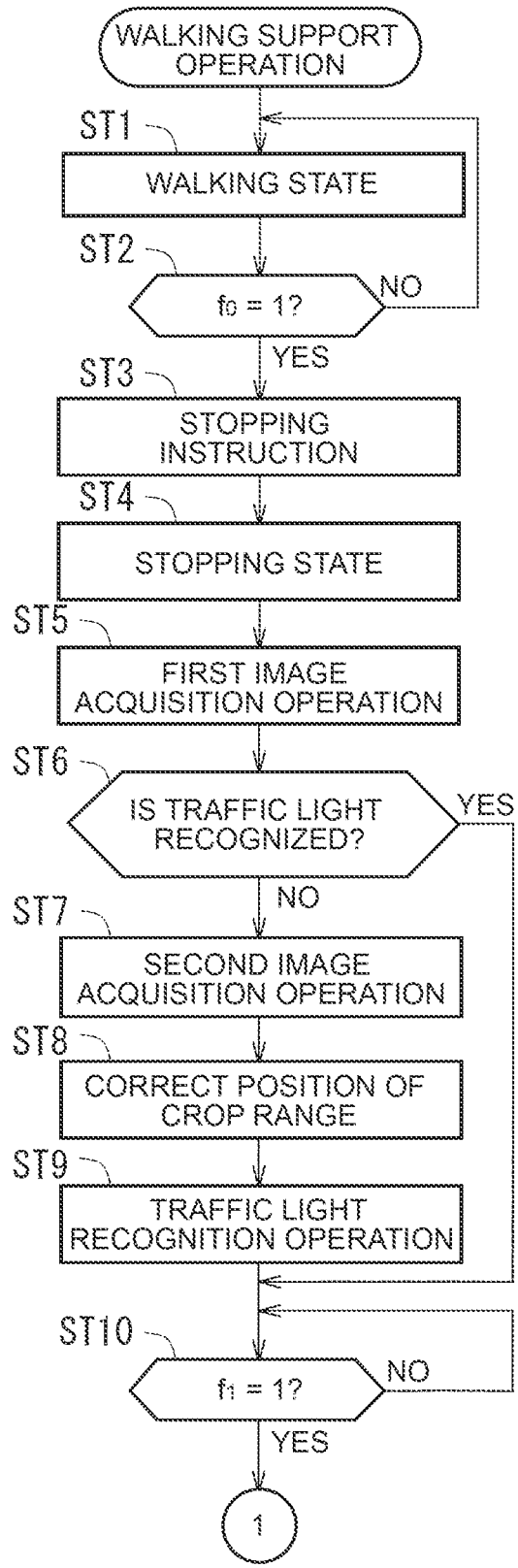
FIG. 16 is a flowchart showing a part of a procedure of a walking support operation by the walking support system.
Figure 17:
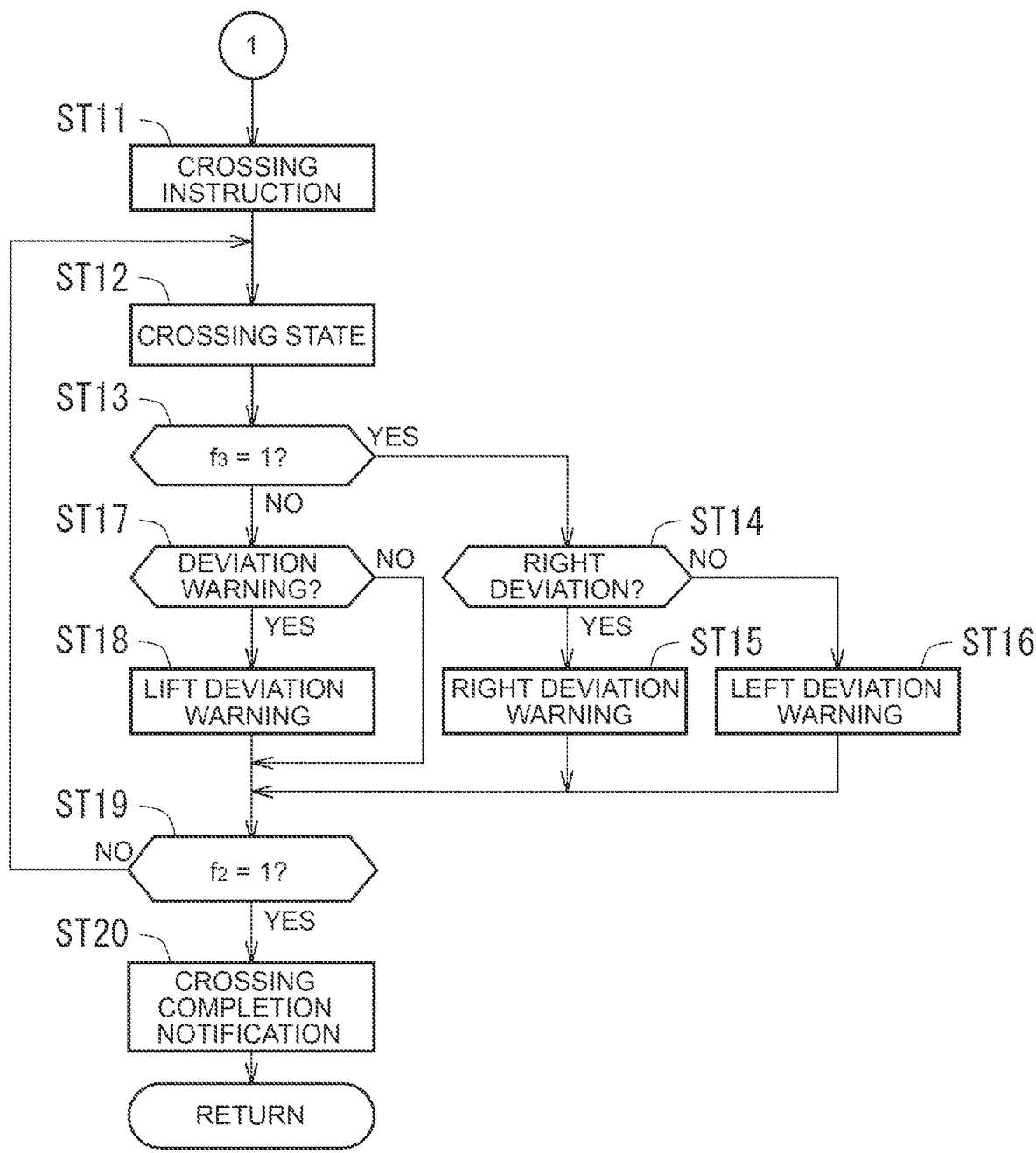
FIG. 17 is a flowchart showing another part of the procedure of the walking support operation by the walking support system.

FIG. 16 and FIG. 17 are flowcharts showing a series of steps of the walking support operation described above. This flowchart is repeatedly executed with a predetermined time interval so that one routine is executed between the predetermined time t to the predetermined time t+1 in a situation where the visually impaired person VP is walking on the road (on the sidewalk). In the following description, the description of the variables (J, $X_{t+1}$) in each state transition function will be omitted.

First, in the situation where the visually impaired person VP is in the walking state in step ST1, based on the position of the white line WL1 of the pedestrian crossing CW in the image area including the pedestrian crossing CW (more specifically, the position of the boundary box of the white line WL1 at the foremost position) recognized by the white line recognition unit 87 in step ST2, it is determined whether "1" is obtained in the state transition function $f_0$ (equation 12) for determining whether the condition for performing the above-mentioned stopping instruction ($y_{t=1}$) is satisfied.

When "0" is obtained in this state transition function $f_0$, it is determined that the condition for issuing the stopping instruction ($y_t$=1) is not satisfied, that is, it is determined that the visually impaired person VP has not yet reaching the front of the pedestrian crossing CW and thus, the determination is NO, and the process returns to step ST1. Since the determination is NO in step ST2 until the visually impaired person VP reaches the front of the pedestrian crossing CW, the operations of steps ST1 and ST2 are repeated.

When the visually impaired person VP reaches the front of the pedestrian crossing CW and "1" is obtained in the state transition function $f_0$, it is determined YES in step ST2, and the process proceeds to step ST3. In this step ST3, the stopping instruction ($y_t$=1) is given to the visually impaired person VP. Specifically, the vibration generator 50 of the white cane 1 held by the visually impaired person VP vibrates in a pattern indicating the stopping instruction (stopping notification). As a result, the visually impaired person VP holding the grip portion 3 of the white cane 1 recognizes that the stopping instruction by feeling the vibration pattern of the vibration generator 50, and stops walking.

In the situation where the visually impaired person VP is in the stopped state in step ST4, the above-mentioned first image acquisition operation by the camera 20 is performed in step ST5. This operation corresponds to the operation of the first image acquisition operation instruction unit (in the present disclosure, the first image acquisition operation instruction unit that makes the image acquisition unit perform the first image acquisition operation, in the state where both the pedestrian crossing and the traffic light are present in the field of view of the image acquisition unit when the pedestrian crossing is present in front of the pedestrian in the walking direction) 82.

Then, in step ST6, it is determined whether the presence of the traffic light TL is recognized in the image acquired by this first image acquisition operation. This determination is made using the above-mentioned traffic light recognition function $g_1(t+1)$. This operation corresponds to the operation of the traffic light recognition determination unit (in the present disclosure, the traffic light recognition determination unit that determines whether the presence of the traffic light is recognized in the image acquired by the first image acquisition operation) 83.

When the presence of the traffic light TL is recognized in the image acquired by this first image acquisition operation, the determination is YES in step ST6 and the process proceeds to step ST10. In contrast, when the presence of the traffic light TL is not recognized, the determination is NO in step ST6 and the process proceeds to step ST7, and the above-mentioned second image acquisition operation (a capturing operation at high resolution) by the camera 20 is performed. This operation corresponds to the operation of the second image acquisition operation instruction unit (in the present disclosure, the second image acquisition operation instruction unit that makes the image acquisition unit perform the second image acquisition operation when the traffic light recognition determination unit determines that the presence of the traffic light is not recognized) 84.

After the second image acquisition operation is performed, in step ST8, the position of the crop range is corrected by the above-mentioned equation (6), and in step ST9, the recognition operation of the traffic light TL at high resolution is performed.

After the traffic light TL is recognized, in step ST10, it is determined whether "1" is obtained in the state transition function $f_1$ (equation 15) for determining whether the condition for performing the above-mentioned walking instruction ($y_t$=2) is satisfied.

When "0" is obtained in this state transition function $f_1$, it is determined that the condition for giving the walking instruction ($y_t$=2) is not satisfied, that is, it is determined NO since the traffic light TL has not yet switched to the green light, and waits until the traffic light TL switches to the green light.

When the traffic light TL switches to the green light and "1" is obtained in the state transition function $f_1$, it is determined YES in step ST10, and the process proceeds to step ST11 (FIG. 17). This operation corresponds to the operation of the traffic light state determination unit (in the present disclosure, the traffic light state determination unit that determines whether the state of the traffic light recognized by the acquired image is the stopping instruction state or the crossing permission state) 85, and corresponds to the operation of the switching recognition unit (in the present disclosure, the switching recognition unit that recognizes that the state of the traffic light has been switched from the stopping instruction state to the crossing permission state) 86.

In step ST11, the walking (crossing) instruction ($y_t$=2) is given to the visually impaired person VP. Specifically, the vibration generator 50 of the white cane 1 held by the visually impaired person VP vibrates in a pattern indicating the walking instruction (notification to start crossing). As a result, the visually impaired person VP holding the grip portion 3 of the white cane 1 recognizes that the walking instruction has been issued and starts crossing the pedestrian crossing CW.

In a situation where the visually impaired person VP is in the crossing state of the pedestrian crossing CW in step ST12, it is determined in step ST13 whether "1" is obtained in the state transition function $f_3$ (equation 19 described above) for determining whether the condition of issuing a warning of deviation from the pedestrian crossing CW is satisfied.

When "1" is obtained in the state transition function $f_3$ and the determination is YES in step ST13, it is determined whether the direction of deviation from the pedestrian crossing CW is the right direction (right deviation) in step ST14. Then, when the direction of deviation from the pedestrian crossing CW is the right direction and the determination is YES in step ST14, the process proceeds to step ST15, and the right deviation warning ($y_t$=3) is issued to the visually impaired person VP. Specifically, the vibration generator 50 of the white cane 1 held by the visually impaired person VP vibrates in a pattern indicating the right deviation warning. As a result, the visually impaired person VP holding the grip portion 3 of the white cane 1 recognizes that the right deviation warning has been issued, and changes the walking direction toward the left direction.

In contrast, when the direction of deviation from the pedestrian crossing CW is the left direction and the determination is NO in step ST14, the process proceeds to step ST16, and the left deviation warning ($y_t$=4) is issued to the visually impaired person VP. Specifically, the vibration generator 50 of the white cane 1 held by the visually impaired person VP vibrates in a pattern indicating the left deviation warning. As a result, the visually impaired person VP holding the grip portion 3 of the white cane 1 recognizes that the left deviation warning has been issued, and changes the walking direction toward the right direction. After issuing the deviation warning in this way, the process proceeds to step ST19.

When there is no deviation from the pedestrian crossing CW and "0" is obtained in the state transition function $f_3$, the determination is NO in step ST13, and the process proceeds to step ST17. In this step ST17, it is determined whether the deviation warning in step ST15 or step ST16 is currently occurring. When the deviation warning is not being issued and the determination is NO in step ST17, the process proceeds to step ST19. In contrast, when the deviation warning is being generated and the determination is YES in step ST17, the process proceeds to step ST18, the deviation warning is lifted, and the process proceeds to step ST19.

In step ST19, it is determined whether "1" is obtained in the state transition function $f_2$ (the equation 18 described above) for determining whether the condition for issuing the crossing completion notification is satisfied.

When "0" is obtained in this state transition function $f_2$, it is determined that the condition for issuing the crossing completion notification is not satisfied, that is, it is determined that the visually impaired person VP crossing the pedestrian crossing CW and thus, the determination is NO, and the process returns to step ST12. Since the determination is NO in step ST19 until the visually impaired person VP completes crossing the pedestrian crossing CW, the operations of steps ST12 to ST19 are repeated.

That is, when a deviation from the pedestrian crossing CW occurs while the visually impaired person VP is crossing, the above-mentioned deviation warning is given. When this deviation is resolved, an operation such as lifting the deviation warning is performed until the crossing of the pedestrian crossing CW is completed.

When the visually impaired person VP has completed the crossing pedestrian crossing CW and "1" is obtained in the state transition function $f_2$, the determination is YES in step ST19, the process proceeds to step ST20, and the visually impaired person VP is notified that the crossing is completed. Specifically, the vibration generator 50 of the white cane 1 held by the visually impaired person VP vibrates in a pattern indicating the crossing completion. As a result, the visually impaired person VP holding the grip portion 3 of the white cane 1 recognizes that the crossing completion notification has been issued, and returns to the normal walking state.

In this way, the above-mentioned operation is repeated every time the visually impaired person VP crosses the pedestrian crossing CW.

Effects of Embodiment

As described above, in the present embodiment, when it is determined that the presence of the traffic light TL is not recognized in the image acquired by the first image acquisition operation by the camera 20, the presence of the traffic light TL is recognized in the image acquired by the second image acquisition operation in which the recognition accuracy of the presence of the traffic light TL is improved. In this second image acquisition operation, although there is a possibility that the recognition accuracy of the presence of the traffic light TL is improved and that the object detection speed is decreased, as the timing at which this second image acquisition operation is performed, it is assumed that the visually impaired person VP is stopped in front of the pedestrian crossing CW, and there is little demand for increasing the detection speed of objects such as moving objects present in the surrounding area. Thus, since the presence of the traffic light TL is recognized in the image acquired by the second image acquisition operation in which the recognition accuracy of the presence of the traffic light TL is improved, sufficient recognition accuracy of the traffic light TL can be obtained, and it is possible to appropriately issue the notification to start crossing to the visually impaired person VP.

Further, in the present embodiment, the notification to start crossing is issued to the visually impaired person VP on the condition that the state of the traffic light TL is switched from the red light to the green light. Thus, when the visually impaired person VP crosses the pedestrian crossing CW, it is possible to secure a sufficient time during which the state of the traffic light TL is green.

Further, in the present embodiment, since the walking support system 10 is realized by only the white cane 1 by incorporating the components of the walking support system 10 into the white cane 1, a highly practical walking support system 10 is provided.

Other Embodiments

It should be noted that the present disclosure is not limited to the embodiment above, and all modifications and applications included in the scope of claims and a range equivalent to the scope of claims are possible.

In the present embodiment, a case where the walking support system 10 is built in the white cane 1 used by the visually impaired person VP will be described. The present disclosure is not limited to this, and may be built in a cane, a handcart, or the like when the pedestrian is an elderly person.

Further, in the above-described embodiment, the case where the first image acquisition operation and the second image acquisition operation are performed once each has been described as an example. The present disclosure is not limited to this, and when the presence of the traffic light TL is not recognized in the image acquired by the first image acquisition operation, the first image acquisition operation may be repeated (retried) a plurality of times, and when the presence of the traffic light TL is still not recognized, the second image acquisition operation may be performed. Further, also this second image acquisition operation may be repeated a plurality of times until the presence of the traffic light TL is recognized. When the presence of the traffic light TL is not recognized in the image acquired by the second image acquisition operation, a third image acquisition operation in which the recognition accuracy of the presence of the traffic light TL is increased may be performed. Further, the shooting in the second image acquisition operation and the third image acquisition operation may be performed by an external device such as a smartphone, and not by the camera 20 built in the white cane 1.

Further, in the above-described embodiment, the first image acquisition operation is performed after issuing the stopping instruction ($y_r$=1) to the visually impaired person VP. The present disclosure is not limited to this, and the first image acquisition operation may be repeated from the stage before the stopping instruction is issued to the visually impaired person VP. However, in this case, in view of the reliability of the recognition of the presence of the traffic light TL, more than the recognition determination of the presence of the traffic light TL by the image acquired by the first image acquisition operation in the stage before the stopping instruction is issued to the visually impaired person VP, the recognition determination of the presence of the traffic light TL based on the image acquired by the first image acquisition operation after the stopping instruction is issued to the visually impaired person VP is prioritized.

Further, in the above-described embodiment, the white cane 1 is provided with the charging socket 70, and the battery (secondary battery) 60 is charged from a household power source. The present disclosure is not limited to this, and a photovoltaic power generation sheet may be attached to the surface of the white cane 1 and the battery 60 may be charged by the electric power generated by the photovoltaic power generation sheet. Further, a primary battery may be used instead of the secondary battery. Further, the white cane 1 may have a built-in pendulum generator, and the pendulum generator may be used to charge the battery 60.

Further, in the present disclosure, the algorithm for recognizing the presence of the traffic light TL in the image acquired by the first image acquisition operation and the algorithm for recognizing the presence of the traffic light TL in the image acquired by the second image acquisition operation do not necessarily have to be the same, and may be algorithms different from each other.

Further, in the above-described embodiment, the types of notifications are classified according to the vibration pattern of the vibration generator 50. The present disclosure is not limited to this, and the notification may be given by voice.

The present disclosure is applicable to a walking support system that issues a notification to start crossing to a pedestrian crossing to a walking visually impaired person.

What is claimed is:

1. A walking support system that at least issues a notification to start crossing to a pedestrian when the pedestrian crosses a pedestrian crossing, the walking support system comprising:
   an image acquisition unit configured to acquire an image in front of the pedestrian in a walking direction;
   a first image acquisition operation instruction unit that makes the image acquisition unit perform a first image acquisition operation, in a state where both the pedestrian crossing and a traffic light are present in a field of view of the image acquisition unit when the pedestrian crossing is present in front of the pedestrian in the walking direction;
   a traffic light recognition determination unit that determines whether a presence of the traffic light is recognized in an image acquired by the first image acquisition operation; and
   a second image acquisition operation instruction unit that makes the image acquisition unit perform a second image acquisition operation when the traffic light recognition determination unit determines that the presence of the traffic light is not recognized,
   wherein a recognition accuracy of the presence of the traffic light is made to be higher in the second image acquisition operation than in the first image acquisition operation.

2. The walking support system according to claim 1, comprising:
   a traffic light state determination unit that determines whether the state of the traffic light recognized by the image acquired by the first image acquisition operation or an image acquired by the second image acquisition operation is a stopping instruction state or a crossing permission state;
   a switching recognition unit that recognizes that the state of the traffic light determined by the traffic light state determination unit is switched from the stopping instruction state to the crossing permission state; and
   a notification unit for issuing the notification to start crossing to the pedestrian on a condition that the state of the traffic light recognized by the switching recognition unit switches from the stopping instruction state to the crossing permission state.

3. The walking support system according to claim 1, comprising a white line recognition unit that recognizes a white line of the pedestrian crossing from the image acquired by the first image acquisition operation,
   wherein a range in which the traffic light is present is specified based on a position of the white line that is recognized in the image.

4. The walking support system according to claim 1, wherein a recognition accuracy of the presence of the traffic light is made to be higher in the second image acquisition operation than in the first image acquisition operation by capturing at a higher resolution than the first image acquisition operation.

5. The walking support system according to claim 1, wherein the image acquisition unit includes a first image acquisition unit that performs the first image acquisition operation and a second image acquisition unit that performs the second image acquisition operation, and a viewing angle of the second image acquisition unit is set to be smaller than a viewing angle of the first image acquisition unit.

6. The walking support system according to claim 2, comprising a storage unit that stores:
   a first state transition function for determining whether a condition for issuing a notification to stop walking to the pedestrian in a walking state in front of the pedestrian crossing is satisfied;
   a traffic light detection function for determining whether the presence of the traffic light is recognized in the image acquired by the first image acquisition operation when the pedestrian is in a stopped state in front of the pedestrian crossing;
   a second state transition function for determining whether a condition for issuing the notification to start crossing the pedestrian crossing to the pedestrian in the stopped state in front of the pedestrian crossing is satisfied;
   a third state transition function for determining whether a condition for issuing a warning of deviation from the pedestrian crossing to the pedestrian in a crossing state of the pedestrian crossing is satisfied; and
   a fourth state transition function for determining whether a condition for issuing a notification that the crossing of the pedestrian crossing has been completed to the pedestrian in the crossing state of the pedestrian crossing is satisfied, wherein the notification unit is configured to issue a notification to the pedestrian in accordance with the satisfaction of the condition when the condition is satisfied by each state transition function.

7. The walking support system according to claim 1, wherein an algorithm for determining whether the presence of the traffic light is recognized in the image acquired by the first image acquisition operation and an algorithm for determining whether the presence of the traffic light is recognized in an image acquired by the second image acquisition operation are algorithms different from each other.

8. The walking support system according to claim 2, wherein the notification unit is built in a white cane used by a visually impaired person, and is configured to notify the visually impaired person that is using the white cane by vibration or voice.

9. The walking support system according to claim 8, wherein each of the image acquisition unit, the first image acquisition operation instruction unit, the traffic light recognition determination unit, the second image acquisition operation instruction unit, the traffic light state determination unit, the switching recognition unit, and the notification unit are built in the white cane.

* * * * *